United States Patent
Barnes et al.

(10) Patent No.: US 10,569,718 B2
(45) Date of Patent: Feb. 25, 2020

(54) SYSTEMS AND METHODS FOR PROVIDING QUICK RELEASE OF VIDEO MONITORS FROM AN ASSEMBLY

(71) Applicant: Panasonic Avionics Corporation, Lake Forest, CA (US)

(72) Inventors: Andrew Barnes, Mission Viejo, CA (US); Steven Vazquez, Alta Loma, CA (US); David Diaz, Rancho Santa Margarita, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 66 days.

(21) Appl. No.: 15/894,551

(22) Filed: Feb. 12, 2018

(65) Prior Publication Data
US 2019/0248298 A1    Aug. 15, 2019

(51) Int. Cl.
*B60R 11/02*  (2006.01)
*B64D 11/00*  (2006.01)
*B60R 11/00*  (2006.01)

(52) U.S. Cl.
CPC .... *B60R 11/0235* (2013.01); *B64D 11/00152* (2014.12); *B60R 2011/0015* (2013.01); *B60R 2011/0071* (2013.01); *B60R 2011/0075* (2013.01)

(58) Field of Classification Search
None
See application file for complete search history.

(56) References Cited

U.S. PATENT DOCUMENTS

| | | | |
|---|---|---|---|
| 5,145,128 A | 9/1992 | Umeda | |
| 5,831,820 A | 11/1998 | Huang | |
| 9,695,972 B1* | 7/2017 | Jiang | B64D 11/00152 |
| 2004/0068985 A1 | 4/2004 | Mernoe | |
| 2016/0039525 A1* | 2/2016 | Pajic | B64D 11/0638 |
| | | | 108/44 |
| 2016/0152340 A1 | 6/2016 | Bauer et al. | |
| 2018/0148173 A1 | 5/2018 | Schwartz et al. | |

OTHER PUBLICATIONS

"Technical Characteristics of Flexinol Actuator Wires", Dynalloy, Inc., F1140 Rev 1.2, pp. 1-12.

* cited by examiner

*Primary Examiner* — Janese Duley
(74) *Attorney, Agent, or Firm* — Klein, O'Neill & Singh, LLP

(57) ABSTRACT

A quick release assembly for use in mounting a display system to a fixture. The system includes an attachment assembly on a back side of the display system that receives pins from a mounting bracket into openings of lock modules that include a latch that holds at least one pin in place. The latch is held in the lock position by spring bias. An actuator wire made of a shape memory alloy contracts when an electrical current is applied. The contraction of the wire overcomes the spring bias to move the latch from the lock position to an unlocked position to allow the display system to be removed from the pin.

20 Claims, 23 Drawing Sheets

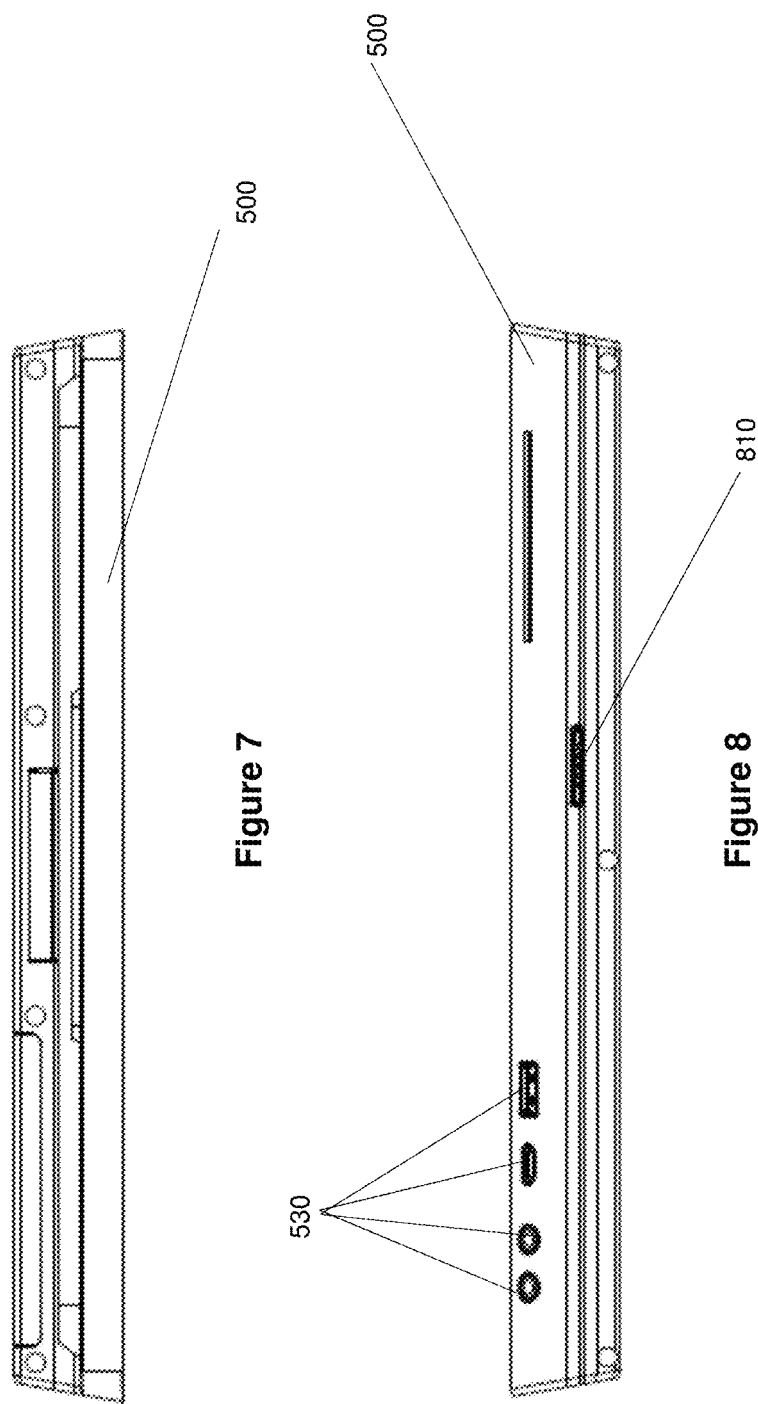

SYSTEMS AND METHODS FOR PROVIDING QUICK RELEASE OF VIDEO MONITORS FROM AN ASSEMBLY

TECHNICAL FIELD

The present disclosure relates to video monitor systems installed in a vehicle and more particularly to a quick release attachment system for affixing a monitor to support structure in a vehicle.

BACKGROUND

It is common to have video monitors affixed to support structure in a transportation vehicle. For example, an information/entertainment display system may be fastened to the rear of a seat of a transportation vehicle, for instance, in an aircraft for use by a passenger. Sometimes, a display system must be removed from the support structure or fixture for service, repair, and/or replacement. To remove the display system from installation in the fixture or support structure, a seat cover and/or other portions of the seat such as cushioning may need to be removed from the seat to obtain access to fasteners holding the display system in place. In addition, the fasteners may require special and expensive tools to release the display system. In commercial passenger transport applications, the turn-around time for repairing or replacing a display system is a significant consideration. As such, continuous efforts are being made to develop better systems for fastening a display system to a fixture or support structure that provide quicker and/or easier release and for access does not require disassembling all or a portion of the fixture or supporting structure.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 7 shows a top view of the display system of FIG. 5, according to one aspect of the present disclosure;

FIG. 8 shows a bottom view of the display system of FIG. 5, according to one aspect of the present disclosure;

DETAILED DESCRIPTION

The detailed description set forth below in connection with the appended drawings is intended as a description of systems and methods for providing a quick release attachment system for a display system in accordance with the various aspects of the present disclosure and is not intended to represent the only forms in which the present disclosure may be constructed or utilized. The description sets forth the features and the steps for constructing and using the systems and methods for providing quick release attachment system of a display system. It is to be understood, however, that the same or equivalent functions and structures may be accomplished by different aspects that are also intended to be encompassed within the spirit and scope of the present disclosure defined by the appended claims.

Figure 17:
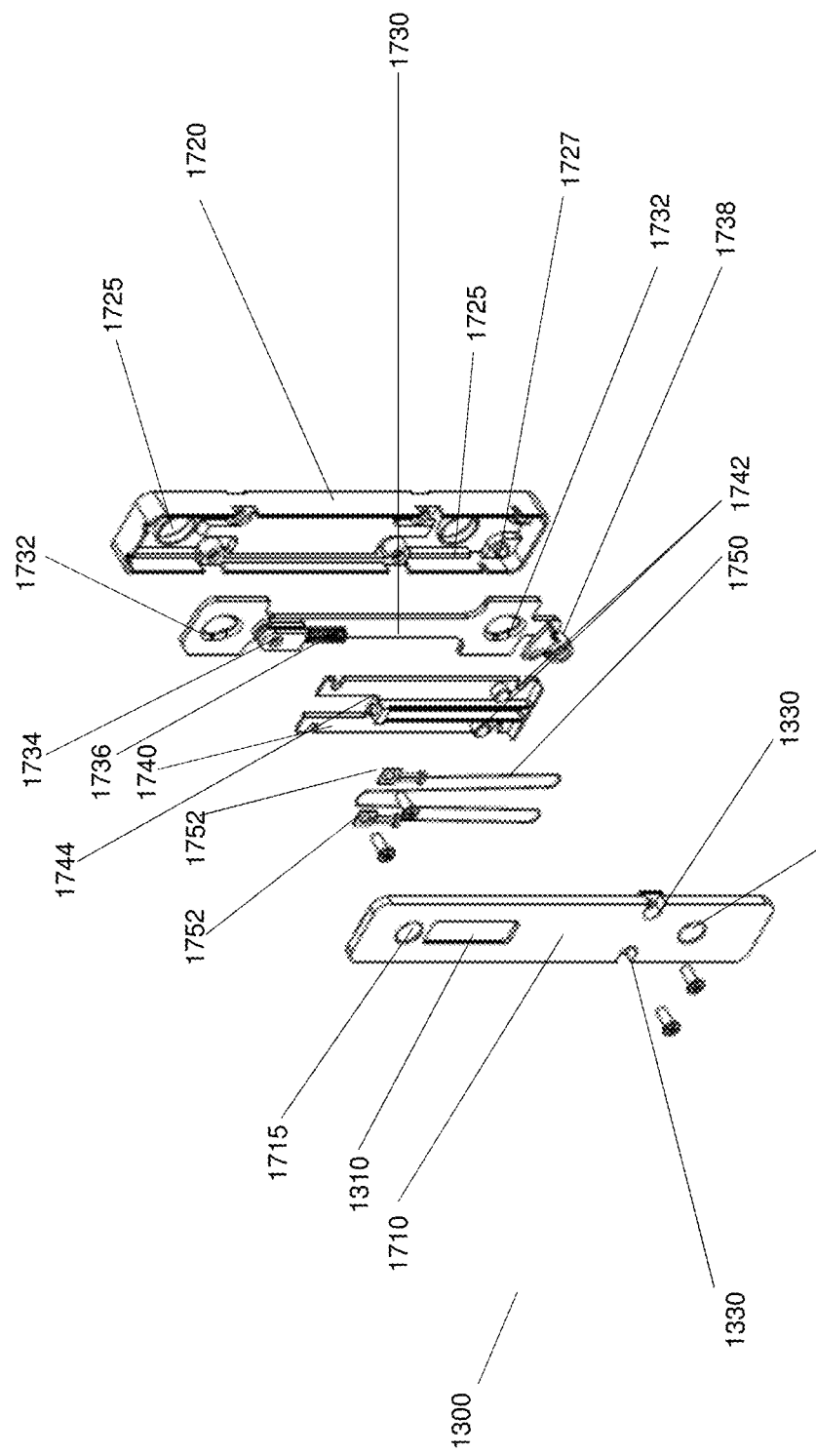
FIG. 17 shows an exploded front perspective of the lock module of FIG. 13, according to one aspect of the present disclosure.

In one aspect, innovative technology for quick release systems is disclosed herein. One innovative quick release attachment system (1220, FIG. 12) of the present disclosure includes a lock module (1250, FIG. 12). The lock module includes a housing (1710, 1720, FIG. 17) having a first opening (1715, FIG. 17) defined through the housing. A lock bar (1730, FIG. 17) in the housing is movable between a first position and a second position along a longitudinal axis and provides a first latch (1732, FIG. 17) for the first opening that moves between a locked position and an unlocked position. The first latch is a first opening defined through the lock bar at a position substantially aligned with the first opening through the housing. The opening of the first latch has a larger area than the first opening through the housing such that an edge of the first opening through the lock bar extends into the first opening through the housing in the locked position when the lock bar is in the first position. The first opening through the housing is unobstructed by the edge of the first opening through lock bar when the lock bar is in a second position causing the latch to be in an unlocked position The lock module includes a spring or other resiliently deformable member for providing a biasing force. Referring to FIG. 17, a lock bar of the module includes a spring seat 1734 on a first surface of the lock bar and a spring resting surface substantially perpendicular to a longitudinal axis of the lock bar. A midframe guide (1740, FIG. 17) in the housing has spring platform (1744, FIG. 17) that is substantially perpendicular to a longitudinal surface of the midframe guide.

In particular, a spring 1736 as shown in FIG. 17, provides bias force to hold the latch in the locked position. The spring has a first end that rests on the spring resting surface of the spring seat and a second surface that rest on the spring platform of the midframe guide in an orientation where a longitudinal axis of the spring is substantially parallel to the longitudinal axis of the lock bar and the longitudinal axis of the midframe guide.

A first terminal and a second terminal (1752, FIG. 17) are affixed to the housing. A wire (1750, FIG. 17)*that* contracts in response to an application of electrical current has one end affixed to the first terminal, a second end affixed to the second terminal, and a portion between the first and second ends that is coupled to the spring seat. As described in more detail in the following paragraphs, the wire 1750 comprises a shape memory alloy (SMA). In particular, the wire is configured to contract in response to an increase in temperature. One of the easiest ways to heat the wire in a controlled and repeatable manner is through resistive heating by application of an electrical current to the wire. The contraction of the wire causes the spring seat to compress the spring against the spring platform. The electrical current is applied to increase the temperature of the wire until it exceeds its austenite transformation temperature and causes the wire to shorten in length. The shortened wire length causes compression of the spring and causes the lock bar to move from the first position to the second position moving the first latch from the locked to the unlocked position.

In one aspect, the first opening through the housing is proximate to a first end of the housing and a second opening (1715, FIG. 17) is defined though a second end of the housing distal from the first end and the lock bar includes a second opening (1732, FIG. 17) aligned with the second opening of the housing that provides a second latch for the second opening.

In one aspect, a wire guide that is a trough defined around a sidewall of the spring seat holds the portion of the wire coupled to the spring seat in place around the seat.

In one aspect, a first bending post (1742, FIG. 17) protrudes from the first surface on a first side of the midframe guide at an end distal from the spring platform and a second bending post (1742, FIG. 17) protrudes from a second side of the midframe guide at the end distal from the spring platform on a second side of the guide that is opposite the first side. The wire has a first portion between the first terminal and the portion coupled to the spring that bends around the first bending post and a second portion between the second terminal and the portion coupled to the spring seat that bends around the second bending post. In an alternative aspect, a bending post is not included and the wire is in a "single loop" around the spring seat. In this alternative aspect, the terminals are located on the bottom side and form a single loop around the spring seat.

In one aspect, a manual release (1738, FIG. 17) is pivotally mounted in the housing under a side of the lock bar that is distal from the spring seat. The manual release is biased to remain in a first position and is rotatable to a second position. When in the first position, the manual release is held in place by the lock bar 1730, which is biased to remain in the locked position by the spring. This is achieved due to the lock bar including a round pin on the bottom side contacting the manual release lever. When the manual release is moved to the second position, the manual release contacts the pin of the lock bar and forces the lock bar downwards against the spring bias and holds it in the unlocked position.

Figure 1:
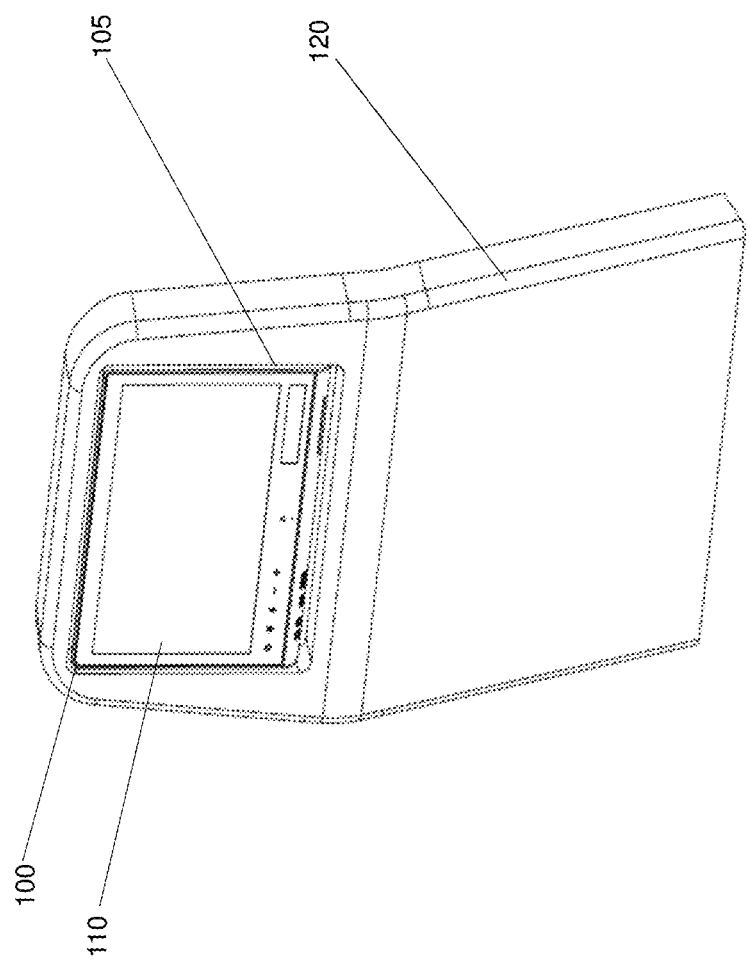
FIG. 1 shows a perspective view of a seat back with a display system installed, according to one aspect of the present disclosure.
Figure 2:
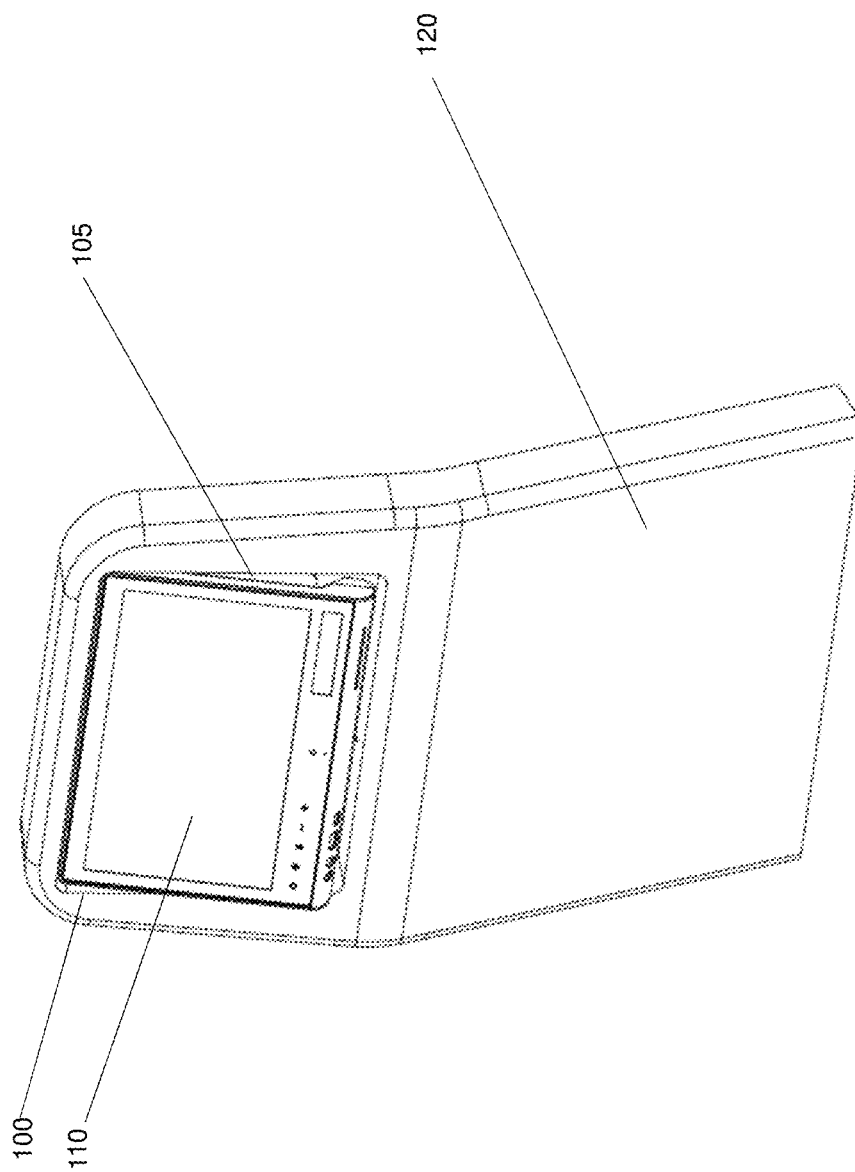
FIG. 2 shows a perspective view of the seat back of FIG. 1 with the display system in a tilted position, according to one aspect of the present disclosure.

System 100:

FIG. 1 shows an example of a quick release mounting system (or assembly) 100 (may also be referred to as "system 100" or "assembly 100") having a receptacle 105 in which a display 110 is mounted in a fixture, for example, a seat 120 (or seatback 120) as described below in detail. System 100 may be part of the seat 120 as shown in FIG. 1 or may be in another fixture in a transportation vehicle including, but not limited to a wall, a hand rest, a door, a bulkhead, and the like. A transportation vehicle may be an airplane, a train, a bus, an automobile, a shipping vessel, a recreation vehicle, or any other type of transportation vehicle. The receptacle 105 may include a mounting assembly that allows the display device to be tilted (as shown in FIG. 2) or enabled to move in some other manner to allow a user, such as a passenger and/or crew member to better view the display.

Figure 3:
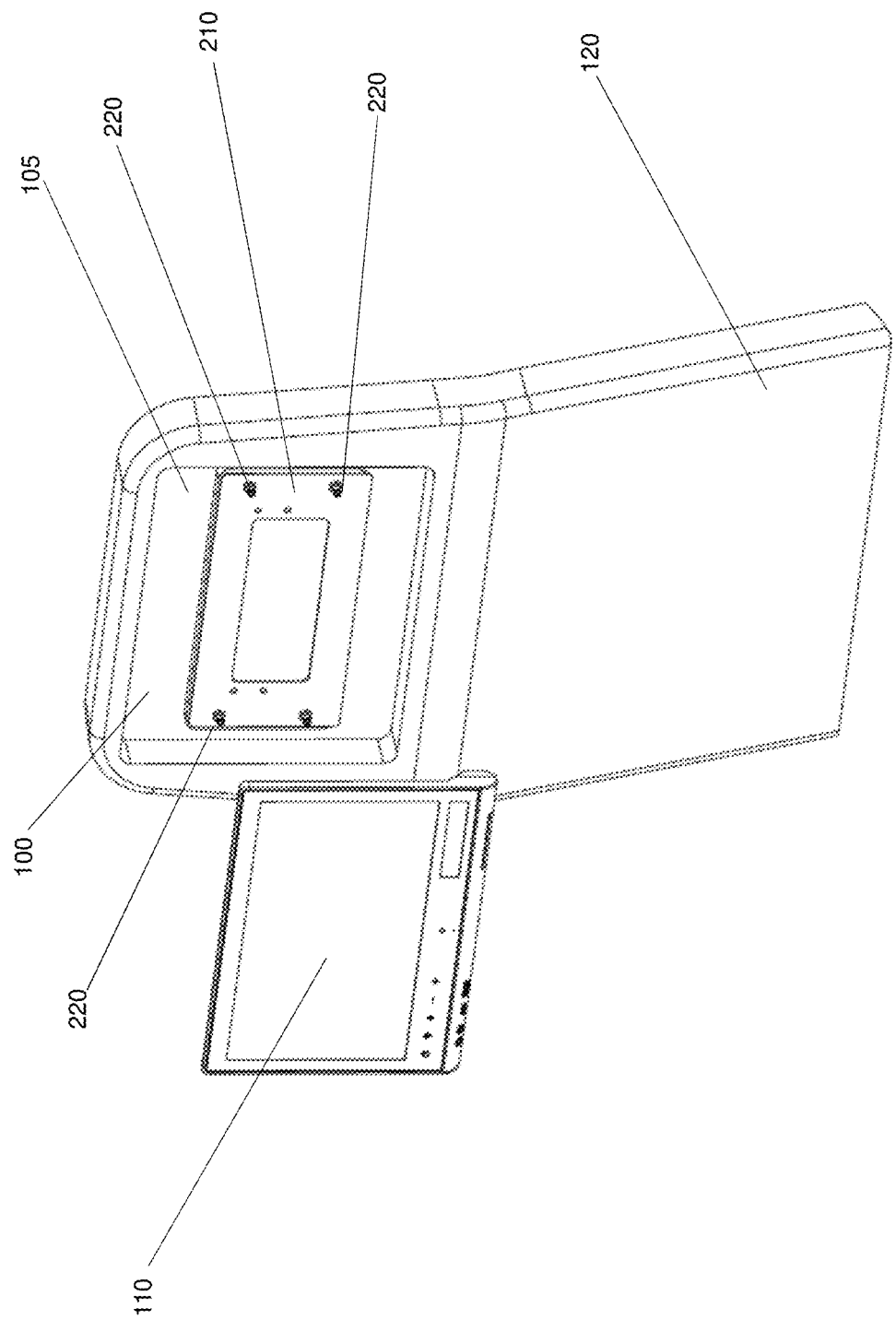
FIG. 3 shows an exploded view of a display system and the seat back of FIG. 1, according to one aspect of the present disclosure.
Figure 4:
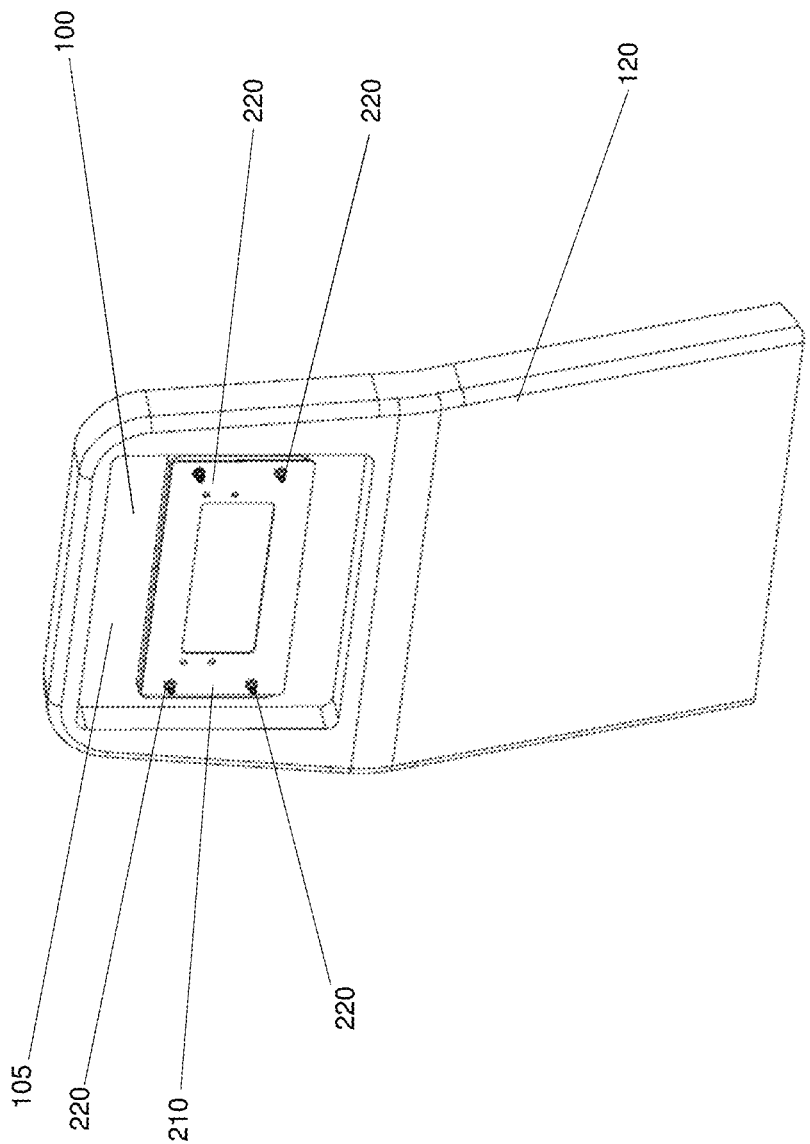
FIG. 4 shows a perspective view of the seat back of FIG. 1 with the display system removed showing a mounting bracket for a display system, according to one aspect of the present disclosure.

FIG. 3 is a perspective view of a display 110 removed from receptacle 105 and FIG. 4 is a perspective view of seat 120 with an exposed receptacle 105. As seen in FIGS. 3 and 4, a mounting bracket or assembly 210 is affixed or is integral to a surface of receptacle 105 in seat 120. The mounting bracket 210 is rectangular shaped and includes four pins 220. Each of the pins 220 are shown as substantially positioned in a corner of mounting bracket 210. Although, mounting bracket 210 is shown as rectangular, mounting bracket 210 may be any other shape. The number and placement of the pins 220 may vary depending on properties and design of the display system being installed in receptacle 105. The pins are threaded on the back side and can be fastened to the seat bracket with a nut. The location of the pins can be arranged such that the same position can be provided for a conventional display system (a non-quick release monitor attached using conventional techniques, such as fasteners). This allows the same seat bracket design to be used for quick release or non-quick release display systems. The properties may include, but are not limited to, the size, weight, shape, and configuration of the display system.

The pins 220 protrude out of the mounting bracket 210 and are received in fasteners of an attachment assembly (Not Shown) in the display system 110. The fasteners of the attachment assembly receive the pins and have latches that lock the pins in place in the fasteners.

In one aspect, the installed display system 110 may be used to access seat functions and entertainment/informational content on transportation vehicles that use various computing devices for providing various functions, including entertainment, system control, content storage, and other functions.

Transportation vehicles may have individualized functional equipment dedicated to a particular passenger (or crew member) seat, which can be utilized by the passenger using display system 110. The functional equipment may include, but is not limited to, adjustable seats, adjustable environmental controls, adjustable lighting, telephony systems, video and/or audio entertainment systems, crew communication systems, and the like. As an example, many commercial airplanes today have individualized video and audio entertainment systems, often referred to as "inflight entertainment" or "IFE" systems. Such systems may also be referred to as "inflight entertainment and communication" systems as well, and typically abbreviated as "IFEC" systems. An example of an aircraft passenger IFE systems, include Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application. It is noteworthy that the adaptive features of the present system is not limited to any specific IFE system or any other functionality and can be used in a broad range of applications, including vehicles in addition to aircraft, such as trains, busses, marine vessels and other vehicles, and stationary environments, such as in buildings.

Figure 5:
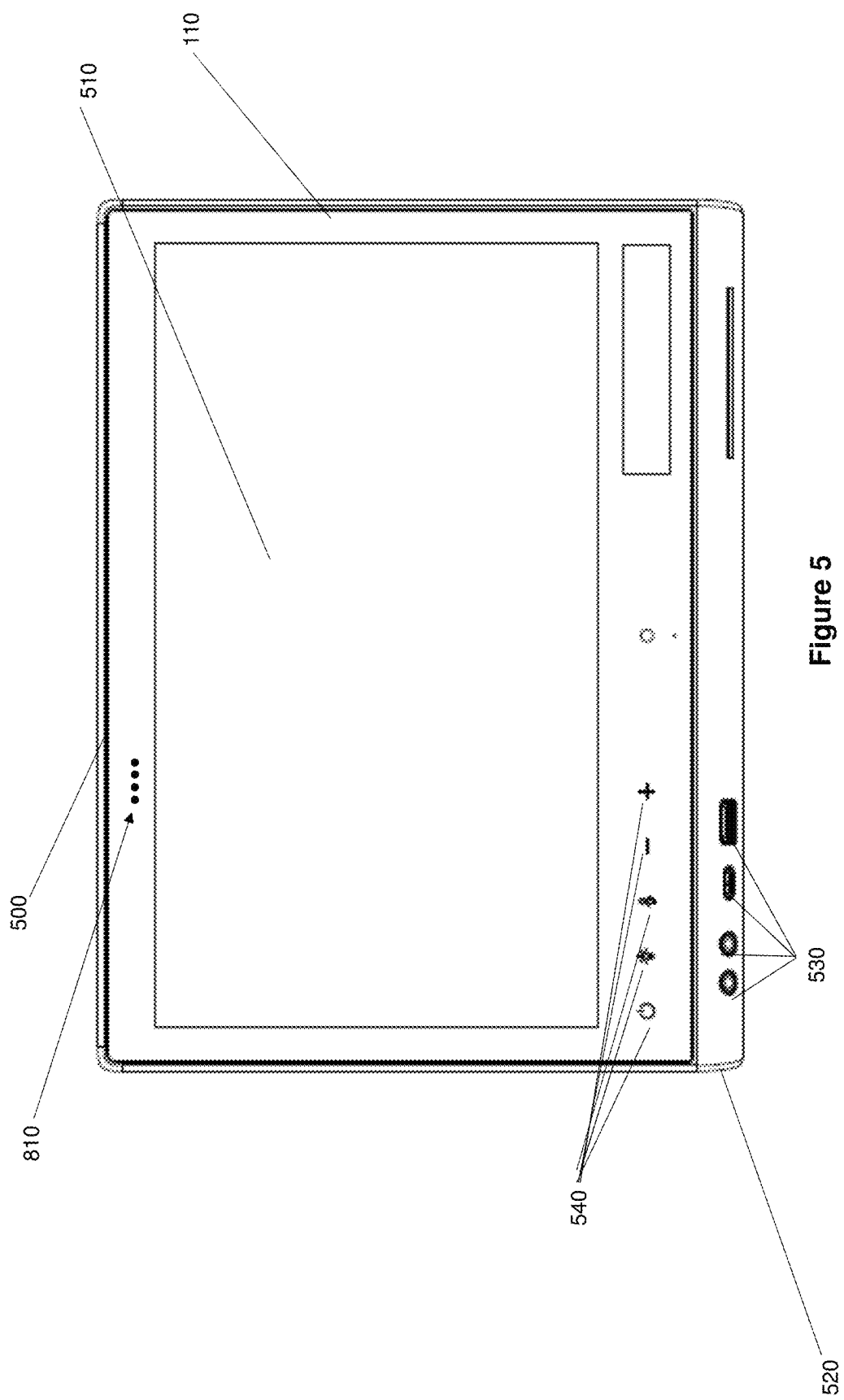
FIG. 5 shows a front view of a display system, according to one aspect of the present disclosure.

Display System 110:

FIGS. 5-12 show different views of display system 110 illustrating various innovative features, according to one aspect of the present disclosure. For example, FIG. 5 shows a front 2D view of display system 110. Display system 110 includes a housing 500 that has an opening for a display 510 on a front side of the housing 500. At a bottom end of the first side, various ports 530 protrude through housing 500 to connect to various other devices. The ports may include, but are not limited to, a headphone/audio jack, a Universal Serial Bus (USB) port, and/or any other type of port for connected to another device. Although shown on the bottom side of the front side of housing 500, the ports may be placed anywhere along housing 500 that allows for easy access by a user and/or fits with the configuration of the electrical components of display system 110 inside of housing 500.

Furthermore, control buttons 540 may be integral to a front side of display 110 and/or protrude through one or more openings in the front side of display 110. The control buttons may include, but are not limited to, a power button, a brightness control button, call attendant button, a volume up button, a volume down button, and any other button that may control a function and/or property of display system 110. The control buttons 540 may be placed in any position along housing 500 that allows for easy access by a user and/or fits with the configuration of the electrical components of display system 110 inside of housing 500.

Figure 6:
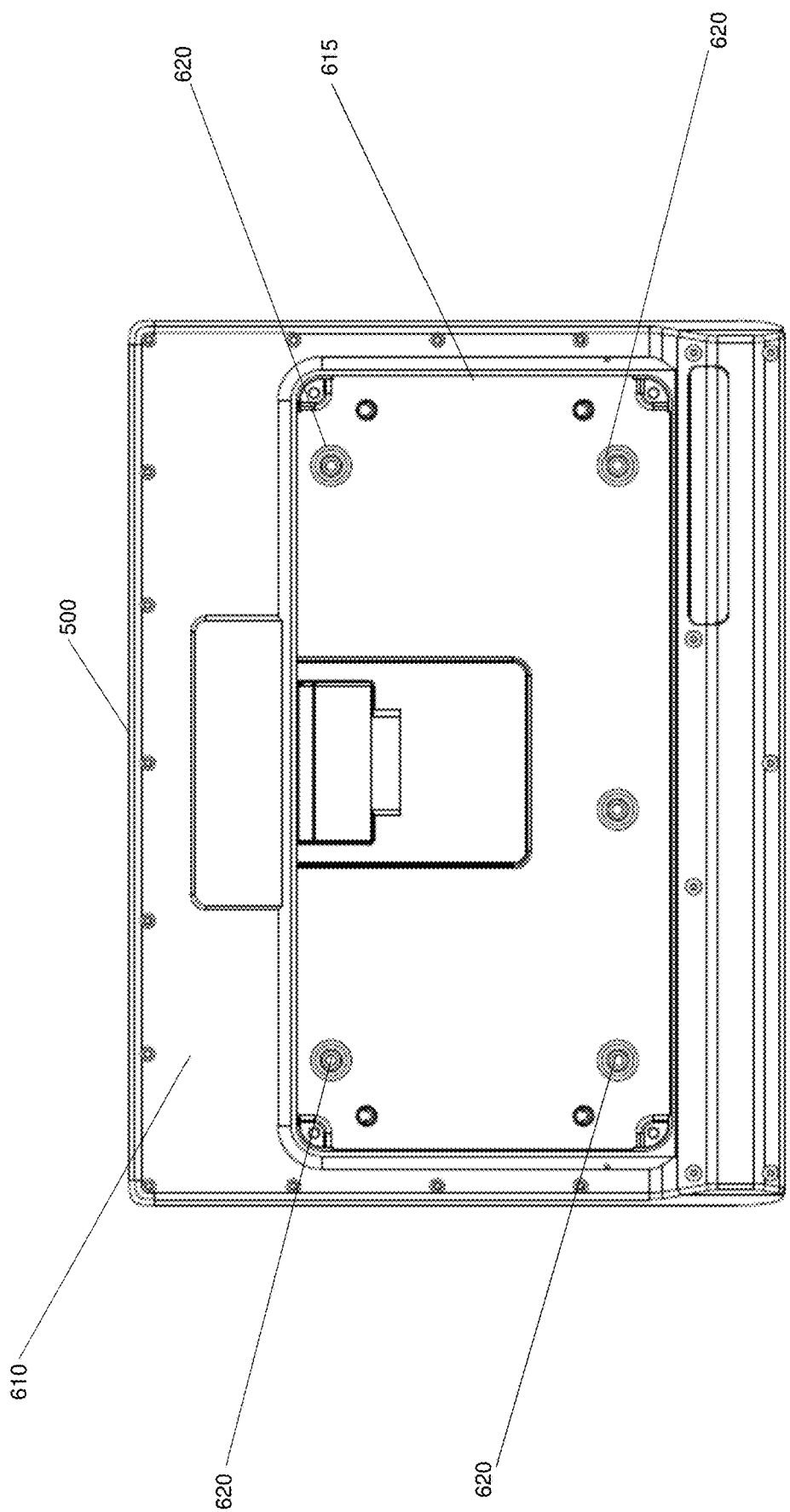
FIG. 6 shows a rear view of the display system of FIG. 5, according to one aspect of the present disclosure.

FIG. 6 shows a back side of display system 110. In FIG. 6, housing 500 includes a back side 610. The back side 610 has an attachment assembly panel 615 that covers an opening in the back side 610 that is over an attachment assembly (Not Shown in FIG. 6). The attachment assembly cover 615 has openings 620 that allow access to fasteners of the attachment assembly though housing 500. Pins of a mounting bracket may extend through openings 620 in the housing 500 to cooperate with the fasteners in the attachment assembly.

In FIG. 6, cover 615 is substantially rectangular shaped and has four openings 620 that are positioned proximate the corners of panel 615. However, the cover 615 may be any shape and the number as well as the positions of the openings 620 may vary depending on the properties of the display system and/or attachment system.

FIG. 7 shows a top side view of the display system 110 and FIG. 8 shows a bottom side view of the display system 110. As seen in FIG. 8, housing 500 includes an opening through which a quick release tool port 810 is accessed. A quick release tool may couple to the port 810 to provide an electric current or some other type of signal to the attachment assembly to cause the fasteners to release the pins of a mounting bracket to allow display system 110 to be removed from the bracket.

Although shown on the bottom side of the housing 500 in FIG. 8, the quick release tool port 810 may be positioned anywhere along the housing 500 that provides convenient access and/or meets the design requirements of the display 100. The design requirements may include, but are not limited to, the aesthetic look of the system, the configuration of circuitry and other components of display system 110 in housing 500, and other properties of display system 110. In an alternative aspect, the quick release tool port 810 may be positioned behind the glass of the display 510 as indicated by the dots in FIG. 5. To access the port 810, cutouts, indicated by dots, are provided in the glass for insertion of pins therein to establish electrical connections with the port behind the glass of the display 510. In another aspect described later, the port 810 has been eliminated. In this aspect, the dots or other marking in FIG. 5 indicate the location of an inductive coil behind the glass of the display 510 for where the quick release tool his held against the glass for establishing inductive (wireless) coupling of the tool with the inductive coil.

Figure 10:
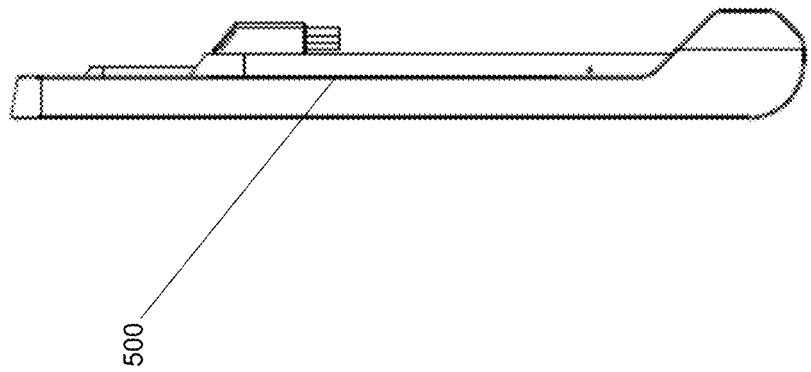
FIG. 10 shows a second side view of the display system of FIG. 5, according to one aspect of the present disclosure.
Figure 9:
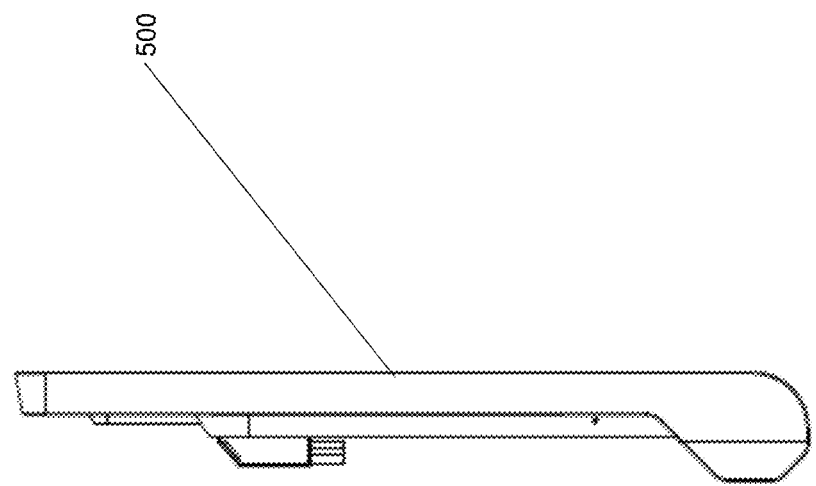
FIG. 9 shows a first side view of the display system of FIG. 5, according to one aspect of the present disclosure.
Figure 11:
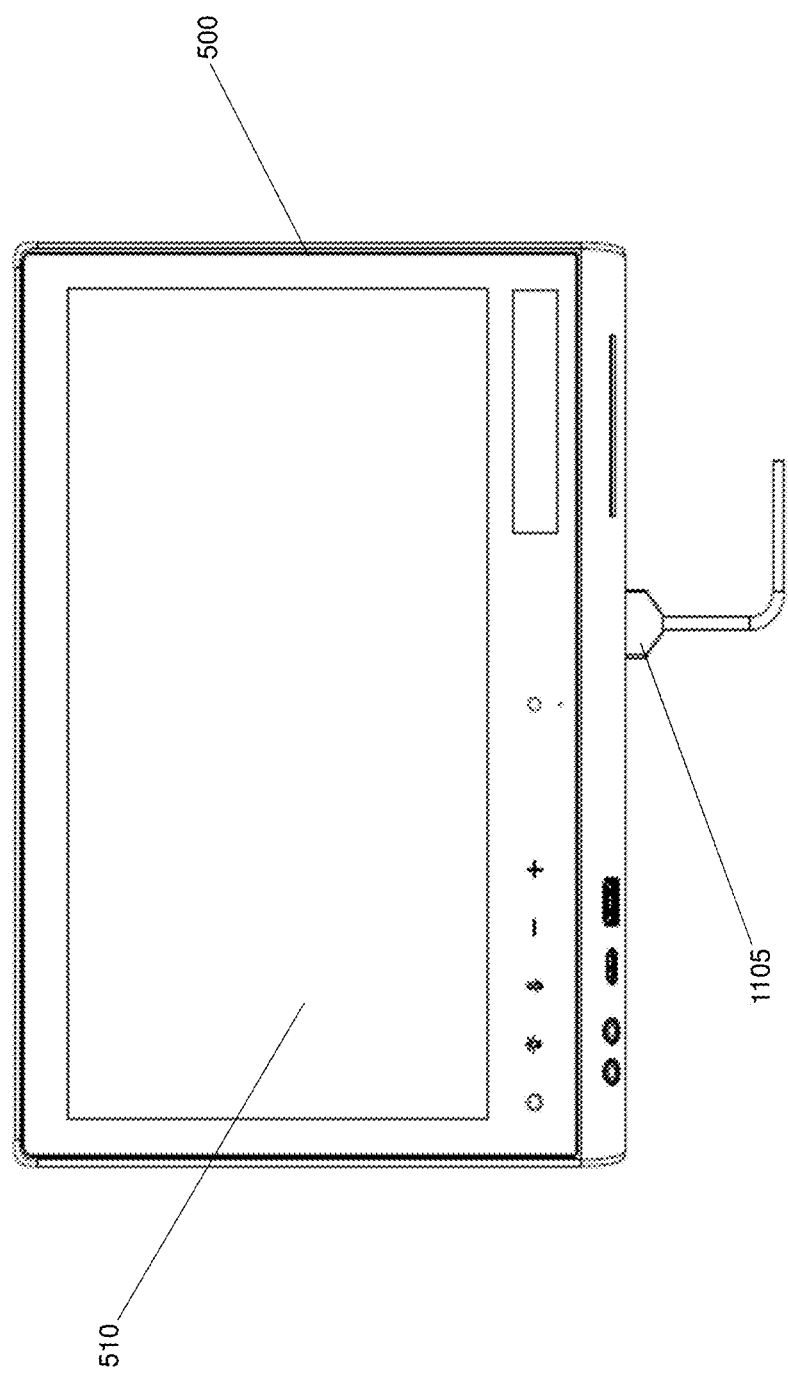
FIG. 11 shows a front view of the display system of FIG. 5 with an quick release tool connector cable attached, according to one aspect of the present disclosure.

FIGS. 9 and 10 show first and second side views of the housing 500 of display system 100. FIG. 11 shows a front view of display system 110 in which a connection cable 1105 including a connector for a quick release tool (Not Shown) is connected to the quick release tool port 810 of display system 110. As will be described in further detail below, the quick release tool may connect to the display system 110 in order to apply an electrical current to a quick release attachment assembly in display system 110 to cause a latch in the one or more fasteners to unlock to allow display system 110 to be removed from the pins of the mounting bracket.

Figure 12:
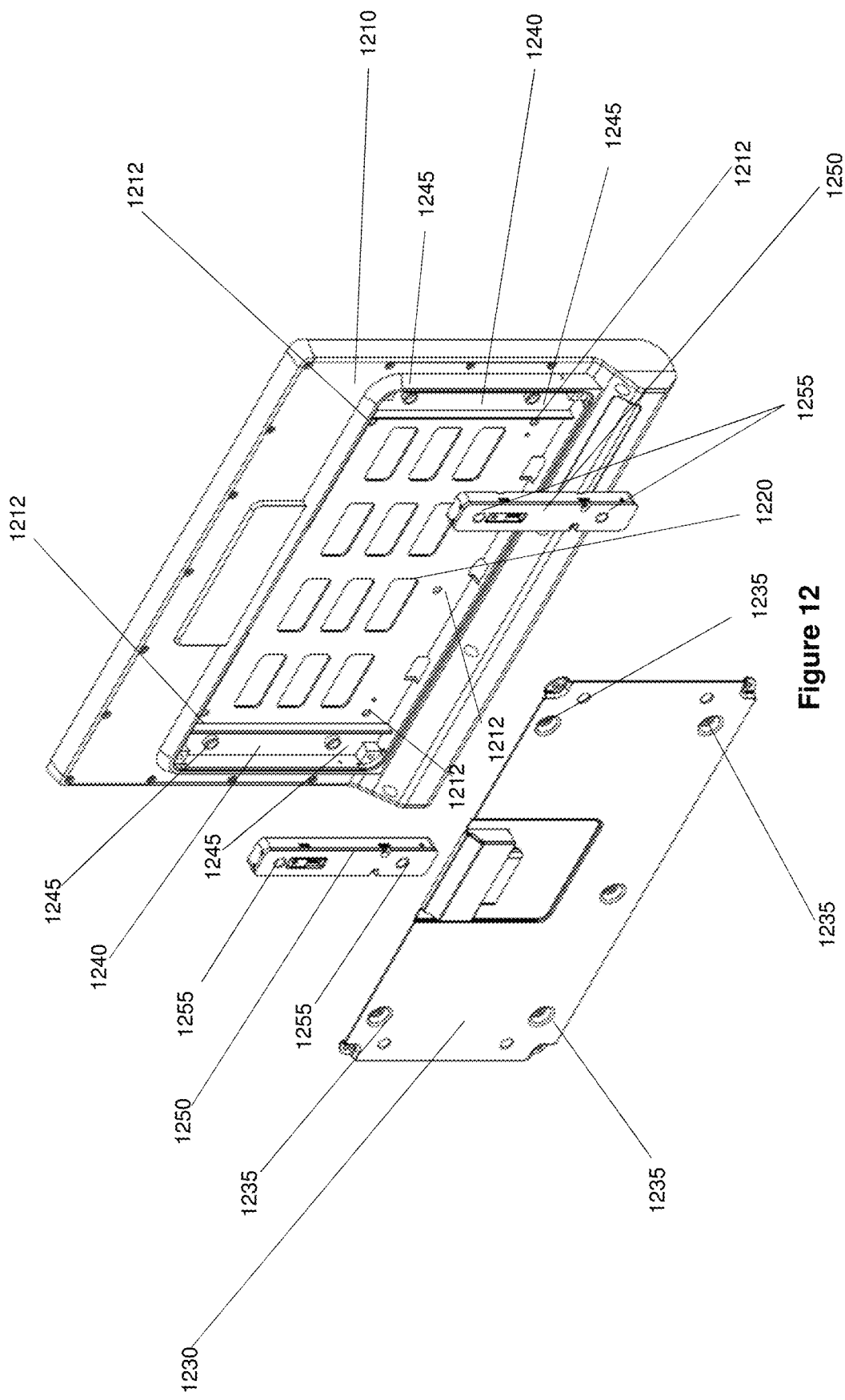
FIG. 12 shows a rear exploded view of the display system of FIG. 5, according to one aspect of the present disclosure.

Quick Release Attachment Assembly Details:

FIG. 12 shows a rear perspective, exploded view of display system 110 that illustrates a quick release attachment assembly in accordance with one aspect of the present disclosure. As seen in FIG. 12, quick release attachment assembly 1220 is on a back cover 1210 of housing 500 of display system 110, i.e., the quick release attachment assembly 1220, back cover 1210, and lock receiving modules 1240 (see below) form portions of the same structural component. A quick release/lock module 1250 is disposed inside of the foregoing structural component and sandwiched between the quick release attachment assembly/chassis 1220 and cover 1230. The cover 1230 fastens to the assembly/chassis 1240 with screws or other conventional techniques.

Quick release attachment assembly 1220 is shown as having a substantially rectangular surface. However, the surface of quick release attachment assembly 1220 may be other shapes depending on the requirements of the display system. As shown, quick release attachment assembly 1220 is affixed to the back cover 1210 by screws that fit through openings 1212 that are aligned with openings (Not Shown) in back cover 1210. However, quick release attachment assembly 1220 may be affixed in other manners including, but not limited to, slot/hook arrangements, cam systems, tabs, epoxy, and any other method that can secure quick release attachment assembly 1220 to back cover 1210. In some alternative aspects, quick release attachment assembly 1220 may be integrally formed in back cover 1210.

Quick release attachment assembly 1220 has a side wall substantially around the perimeter of an inner surface. In the interior of quick release attachment assembly 1220, lock module receiving cavities 1240 are defined on the inner surface to receive lock modules 1250 that provide the fasteners of quick release attachment assembly 1220. As shown, quick release attachment assembly 1220 includes two lock module receiving cavities that are each on an opposing side of the interior quick release attachment assembly 1220. However, quick release attachment assembly 1220 may include any number of lock module cavities 1240 as required to support the display system. Furthermore, the cavities may be placed and/or oriented in other configurations based on the requirements of the system.

Each lock module cavity 1240 is defined by sidewalls on the interior surface of quick release attachment assembly 1220. The sidewalls are configured such that a lock module 1250 fits securely within the cavity. Openings 1245 within each cavity 1240 may be enclosed by sidewalls. The openings 1245 are circular with a diameter slightly larger than the quick release pin and integrated into the chassis, which is preferably formed of metal. The openings 1245 serve to capture the quick release pin and bear the side loads (left/right, top/down).

At the bottom of opening 1245, there is a foam cushion that contacts the pin when it is inserted. The foam cushions pressure placed on the pin to prevent rattling and help damp vibration. The openings 1245 align with openings 1255 through a lock module 1250 to allow a pin from a mounting assembly to pass through the lock module. As shown, the openings 1255 on opposing ends of a longitudinal axis of the lock module. However, the number, placement, and/or orientation of the openings may vary based on design requirements.

In some aspects, the sidewalls of openings 1245 may at least partially extend into the openings 1255 of an inserted lock module. In accordance with various other aspects, the lock module cavity may also include openings, claps, cams, nibs, or the like that cooperate with reciprocating elements of an inserted lock module to fasten the inserted lock model in place.

Each lock module 1250 inserts into one of the lock module cavities 1240. The lock modules may be snap-fitted, press fit, or secured in place by fasteners. Examples of fasteners, includes pins, screws, tabs, and the like. The configuration and/or operation of a lock module 1250 is described in further detail below with respect to FIGS. 13-17.

Quick release attachment assembly cover 1230 fits over the inner surface of quick release attachment assembly 1220. Cover 1230 has openings 1235 defined through the cover 1230 that are aligned with openings 1255 of lock module 1250 and openings 1245 of lock module assembly 1245 to allow a pin from a mounting bracket to extend into the interior of quick release attachment assembly 1220 into the openings 1255 of the lock module. As shown, the cover may be secured in place by screws or other fasteners that fit through openings in the cover that are aligned with openings in the quick release attachment assembly 1220. However, the cover may be press fit, snap fit, or secured in place in some other manner in various other aspects of the disclosure.

Figure 14:
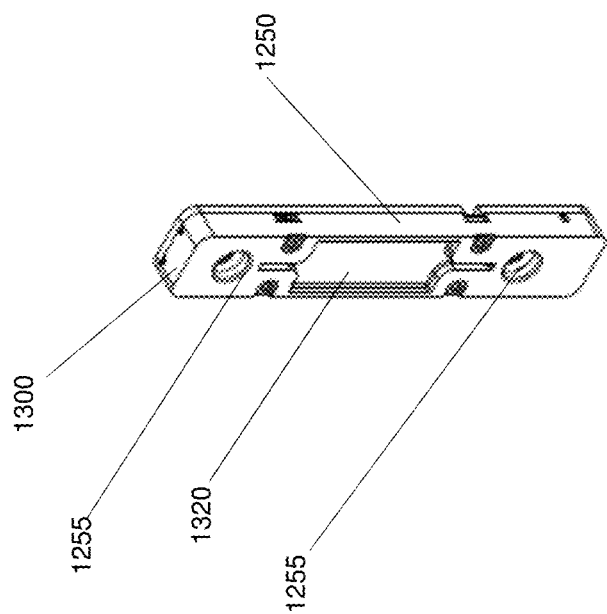
FIG. 14 shows a rear perspective view of a lock module of FIG. 13, according to one aspect of the present disclosure.
Figure 13:
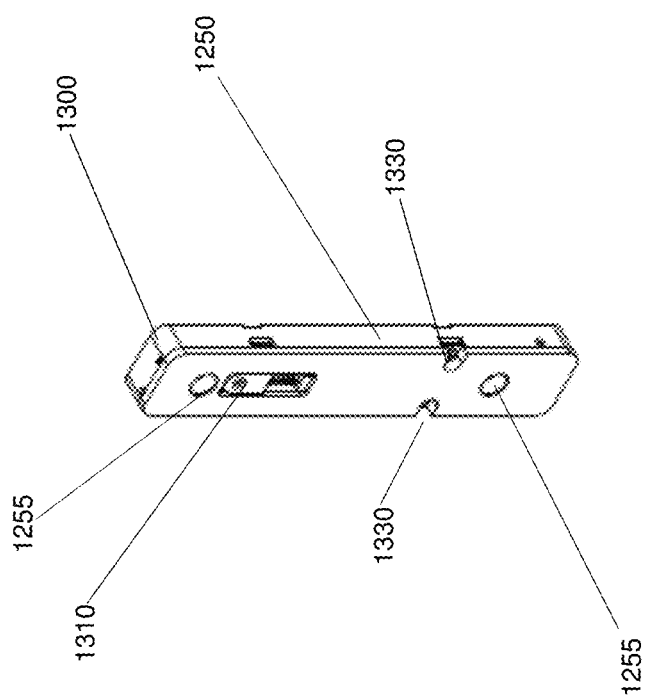
FIG. 13 shows a front perspective view of a lock module, according to one aspect of the present disclosure.

Lock Module 1250:

FIGS. 13-17 show various views of a lock module of a quick release attachment assembly 1220 in one aspect of the disclosure. FIG. 13 shows a front perspective view of lock module 1250 and FIG. 14 shows a rear perspective view of lock module 1250. As shown, lock module 1250 has a housing 1300 that has a front side and a back side. Openings 1255 are defined through lock module 1250 from the front side to the back side. The front side may include an additional opening 1310 that exposes a spring seat and spring inside the housing. The spring seat and spring are described in more detail below with reference to FIG. 17. The front side may also have notches 1330 that include openings that receive screws or other types of fasteners that extend into lock module 1250 to mate with openings in the interior surface to secure portions of housing 1300 to one another. The back side may also include an opening 1320 through the housing that exposes locking components in the lock module. In various other aspects, any of the openings through the housing 1300 of a lock module may be moved, and/or omitted depending on the system requirements of the lock system in the lock module.

Figure 16:
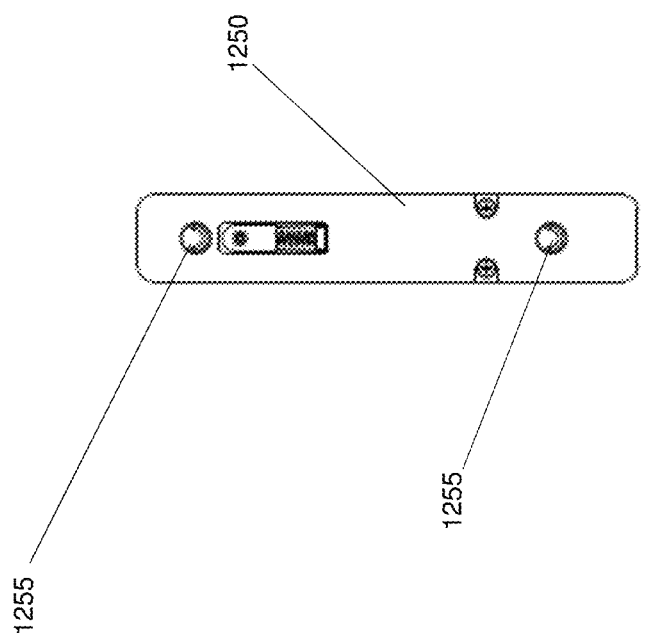
FIG. 16 shows a front view of the lock module of FIG. 13, according to one aspect of the present disclosure.
Figure 15:
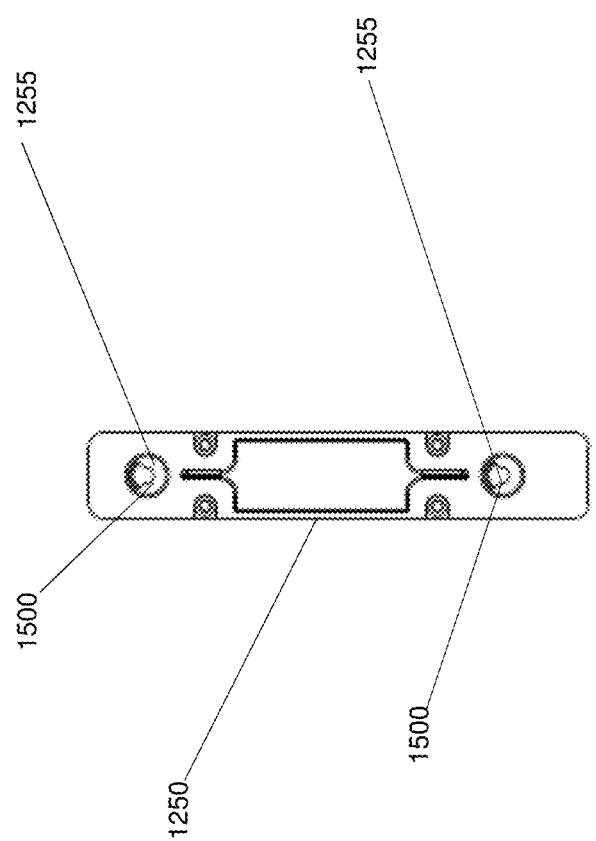
FIG. 15 shows a rear view of the lock module of FIG. 13, according to one aspect of the present disclosure.

FIG. 15 shows a rear 2D view of lock module 1250 in which a latch 1500 is in a locked position protruding into an opening 1255 of the lock module. In the locked position, the latch 1500 engages a pin from the mounting bracket that is inserted into the opening 1255 to secure the pin in place in the opening. FIG. 16 shows a front 2D view of the lock module in which the latch 1500 is in an unlocked position and the openings 1255 are unobstructed. The unobstructed opening allows a pin to be removed. The latch 1500 and various other internal components as well as the operation of the lock module 1250 are discussed in detail below with reference to FIG. 17.

FIG. 17 illustrates an exploded front perspective view of a lock module 1250 in accordance with an aspect of the present disclosure. Lock module 1250 includes a housing 1300 made of a front panel 1710 and a rear portion 1720. In one aspect, the housing 1300 is made of plastic. However, the housing may be made of any lightweight, rigid material in accordance with various other aspects. The front panel 1710 has openings 1715 defined through the panel. Openings 1715 are portions of openings 1255 (Shown in FIG. 12). Openings 1255 extend through lock module 1250 to an aligned opening through rear portion 1720.

Rear portion 1720 has a flat base that is substantially rectangular shaped with a longitudinal and latitudinal axis. A side wall extends out of the surface substantially perpendicular to the plane of the surface around the perimeter of the surface to define an inner surface. Although shown as a rectangular surface, the surface may be various other shapes in accordance with various aspects. Openings 1725 are defined through the surface at substantially opposing ends of the surface along the longitudinal axis. Openings 1725 align with openings 1715 to form opening 1255 through the lock module. The bottom surface also has assorted wells along the perimeter adjacent the sidewall that align with openings on the front panel 1710 and other components of lock module 1250 to receive screws or other fasteners that secure various components to the rear portion 1720. A nib 1727 is provided in a corner of the interior proximate the bottom side to receive a manual release that is discussed further below.

A lock bar 1730 is inserted in the interior of housing 1300 over rear portion 1720. Lock bar 1730 may be made of light weight metallic material or a light weight plastic. The lock bar extends along a longitudinal axis that is substantially parallel to the longitudinal axis of the rear portion 1720. On opposing ends of the lock bar along the longitudinal axis, a pair of base portions widen out from lock base 1730. These based portions may have openings 1732 defined through the base portions. The openings 1732 is slightly smaller in diameter relative to openings 1715 and 1725, and roughly the same diameter as the groove or trough in the quick release pin. The opening 1732 serves to capture the groove in the quick release pin when it is inserted into the module. Opening 1732 also has chamfered/tapered edges so that the lock bar is forced downwards when the pin is inserted, allowing it to lock passively, i.e., without electrical input.

The openings 1732 have an additional notch defined under a bottom side of the openings substantially along the longitudinal axis of the lock bar. The additional notch increases the area of the opening and allows an opening 1255 to be unobstructed when the lock bar moves from a first position to a second position as described below.

A spring seat 1734 is affixed to an outer surface of lock bar 1730 substantially near the base portion on the top side of lock bar 1730. The spring seat 1734 may be affixed to the lock bar 1730 by a screw or other fastener that inserts into an opening in a top surface of the spring seat 1734 and extends through the spring seat into a mated opening on the lock bar (Not Shown). In various other aspects, the spring seat 1734 may be affixed in some other manner or may be integral to lock bar 1730.

Spring seat 1734 has a bottom sidewall that is substantially perpendicular to the longitudinal axis of lock bar 1730. The remaining sidewall is curved along a top side with substantially straight sides between the top and bottom sides. The sidewall may have a trough or channel defined in a side surface of the sidewall for receiving a wire as discussed further below.

A spring 1736 has a first end that may be affixed to or rests against the bottom surface of spring seat 1734. Spring 1736 extends substantially parallel to the longitudinal axis of lock bar 1730.

Lock bar 1730 is movable between a first position and a second position. In the first position, lock bar 1730 is positioned such that an edge around the notch of opening 1732 is within the area of opening 1255 to act as a latch in a locked position and hold a pin in place in the opening. Lock bar 1730 may then move in a direction along its longitudinal axis to a second position. In the shown embodiment, the movement is in a downward direction. However, the movement may be in other direction in accordance with other various aspects. In the second position, the openings 1732 are substantially aligned with openings 1715 of the front panel 1710 and openings 1725 of rear portion 1720 to have the latch in an unlocked position and cause opening 1255 through the lock module to be unobstructed by the edges of opening 1732 that, in turn, allows the pins of the mounting bracket to be removed from the openings. In the shown embodiment, an extension at the bottom of lock bar 1730 may push against a bottom outer wall to restrict the movement to along the longitudinal axis to only between the first and second positions.

A midframe guide 1740 is a substantially rectangular structure that fits between lock bar 1730 and the front panel 1710 of housing 500 in the interior of the housing. However, the midframe guide 1740 may be various other shapes in accordance with various other aspect depending on the requirements of the system. In some aspects, the midframe guide 1740 is made of plastic or some other non-conducting rigid material. The midframe guide 1740 has a notch on a top side that extends down to a spring platform 1744. The spring platform 1744 is a base that extends outward substantially perpendicular to the plane of the front surface of the guide 1740 and is used to secure spring 1736 in place in a substantially uncompressed manner.

Spring 1736 is held between the receiving surface of the spring seat 1734 and the spring platform 1744. Midframe guide 1740 has two notches on opposing sides near the top side that allow screws that connect terminals for an actuator wire to rear portion 1720 of the housing and two notches on the opposing sides that allow the screws that secure the front panel 1710 to the rear portion 1720 to extend through midframe guide 1740. The screws extend through the notches secure midframe guide in place in housing 1300. The midframe guide 1740 also includes guide posts 1742 on opposing sides of the bottom end of the front surface for use in configuring actuator wire 1750.

The actuator wire 1750 is a shape memory alloy (SMA) wire that is stretched to an initial length and wrapped around the ring seat 1734 of the locking bar 1730. When an electrical current is run through the SMA wire, the wire heats up and reaches a temperature that exceeds its austenite transformation temperature. Once this transformation temperature is exceeded, the wire will begin to shorten or contract in length and retract the locking bar 1730. To make actuator wire 1750 an appropriate length to have sufficient force during the shortening to overcome the spring force, the spring 1736 is substantially wrapped around guide posts 1742 and spring seat 1734 to give the wire the length needed to overcome the spring force during retraction due to an applied current.

In this regard, a wire comprised of a shape memory alloy (SMA) typically has a maximum amount of possible deflection/contraction, generally around 4% to 5% of its length. To retract the lock bar, the actuator wire 1750 must be greater than a certain minimum length, which is achieved in the disclosed aspect by wrapping the wire in double loop configuration around the guide posts.

In various other aspects, other configurations of the wire may be used to provide the appropriate length of wire as required by the properties of the lock module. The opposing ends of actuator wire 1750 are connected to terminals 1752 that are affixed to the rear portion 1720 by screws. The terminals are connected to circuitry that connects the connection port for the quick release tool to the actuator wire 1750. Wire made of SMA is commercially available from Dynalloy, Inc. of Irvine Calif. under the trademark FLEXINOL.

A manual release 1738 is pivotally mounted to a nib that extends out of the interior surface of rear portion 1720 of the housing under the lock bar 1730 in a first position. The edge of the manual release 1738 cooperates with the bottom edge of the lock bar 1730 to hold the bar 1730 in place between the first and second positions. The manual release 1738 may manually be pivoted from the first position to a second position in which the edge of the manual release 1738 is no longer under the lock bar 1730. This causes the lock bar 1730 to move to the second position which, in turn, moves the latch to an unlocked position. In order to access the manual release 1738, the front cover 1710 may need to be removed in accordance with some aspects.

Figure 18:
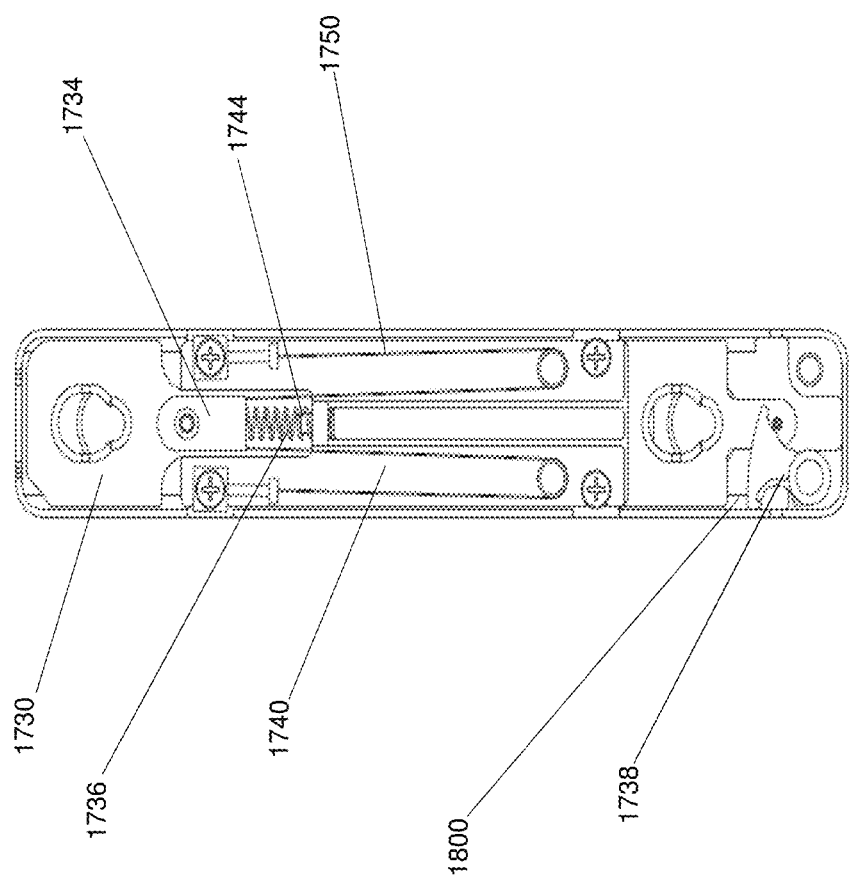
FIG. 18 shows a front view of the lock module of FIG. 13 with front cover removed to show a manual release in a first position, according to one aspect of the disclosure.
Figure 19:
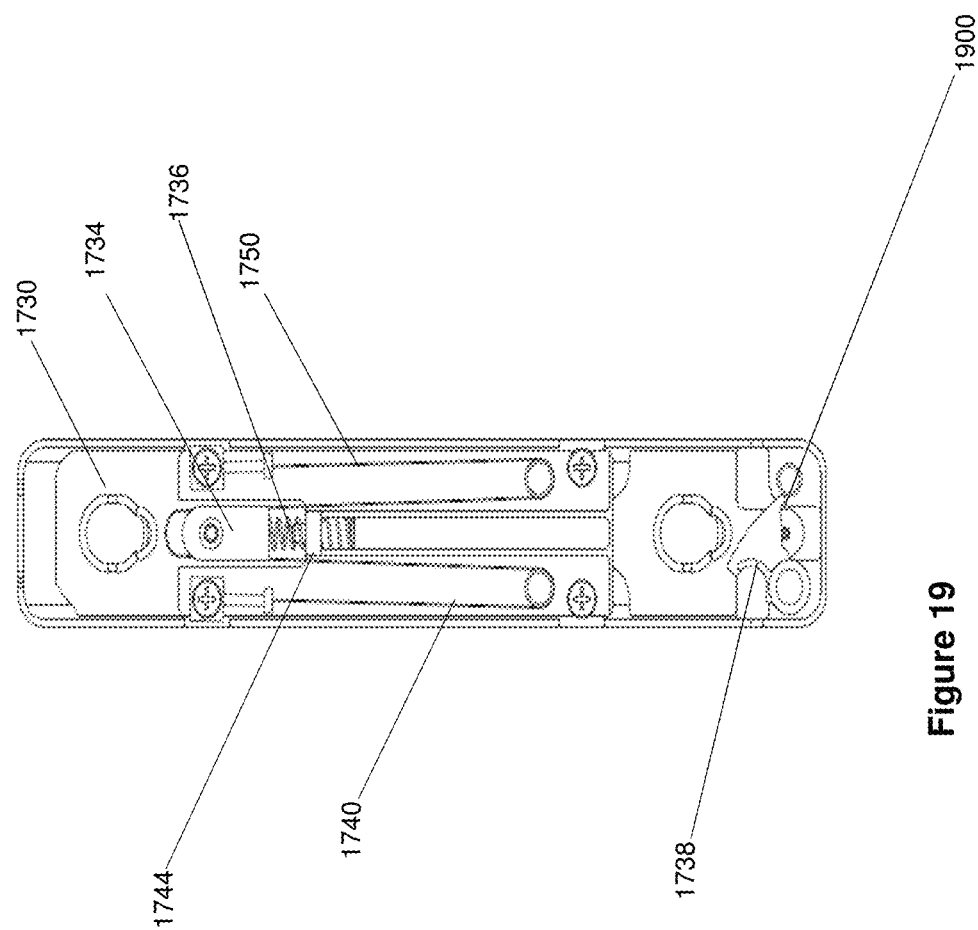
FIG. 19 shows a front view of the lock module of FIG. 13 with front cover removed to show a manual release in a second position, according to one aspect of the disclosure.

FIGS. 18 and 19 illustrate a front view of the lock module with the front cover removed. FIG. 18 shows the manual release 1738 in a first position 1800 holding the lock bar 1730 in a first position. FIG. 19 illustrates the manual release 1738 in a second position 1900 allowing the move to a position where the latch is in an unlocked position.

Figure 20:
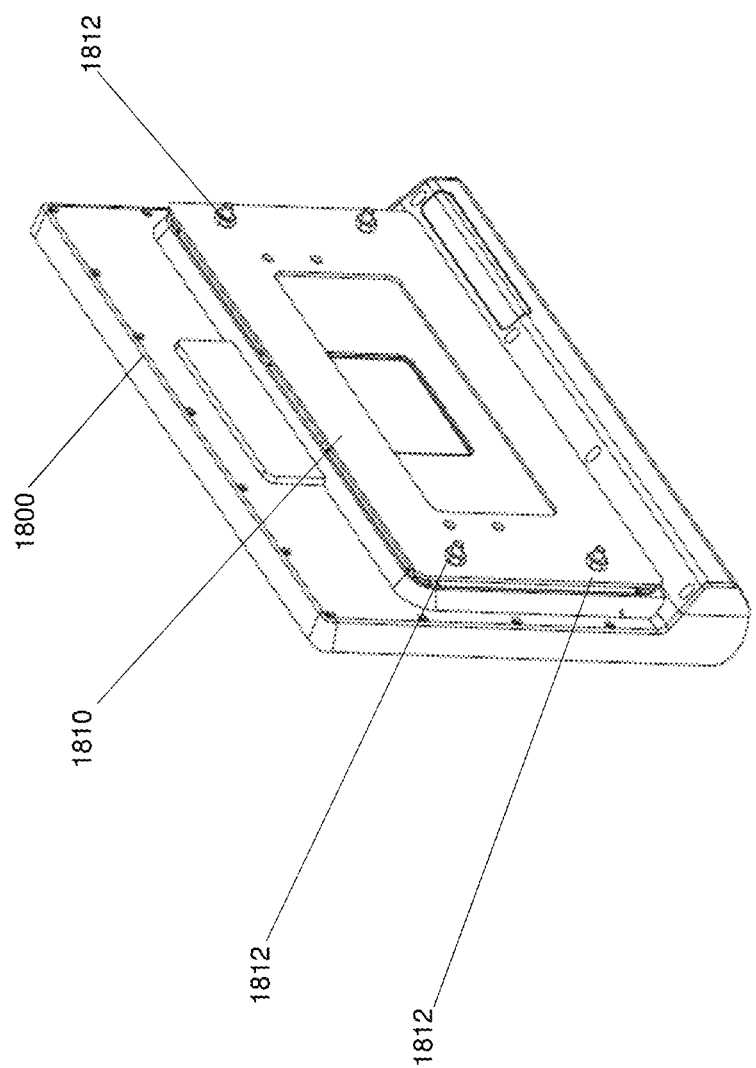
FIG. 20 shows rear perspective view of a display system with a mounting bracket affixed to a quick release attachment assembly of the display system, according to one aspect of the present disclosure.
Figure 21:
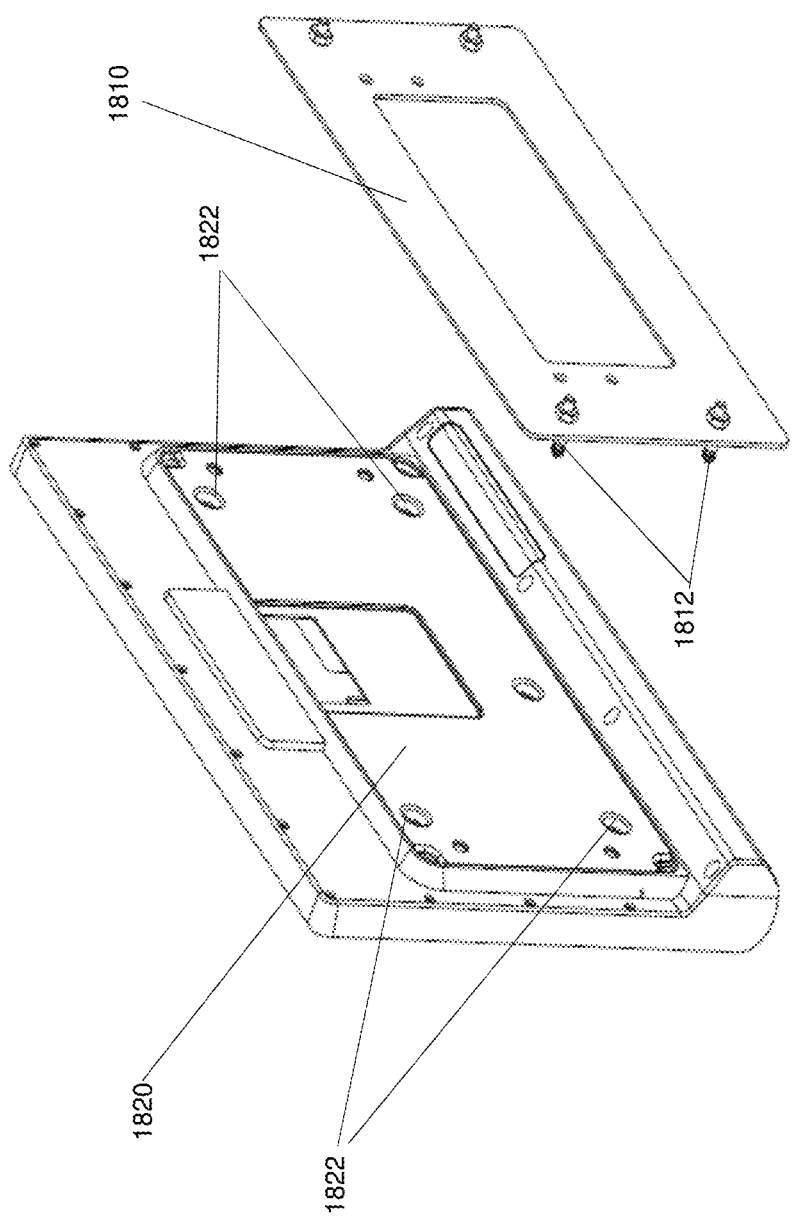
FIG. 21 shows an exploded rear perspective view of the display system of FIG. 20 with a mounting bracket affixed to a quick release attachment assembly of the display system, according to one aspect of the present disclosure.
Figure 22:
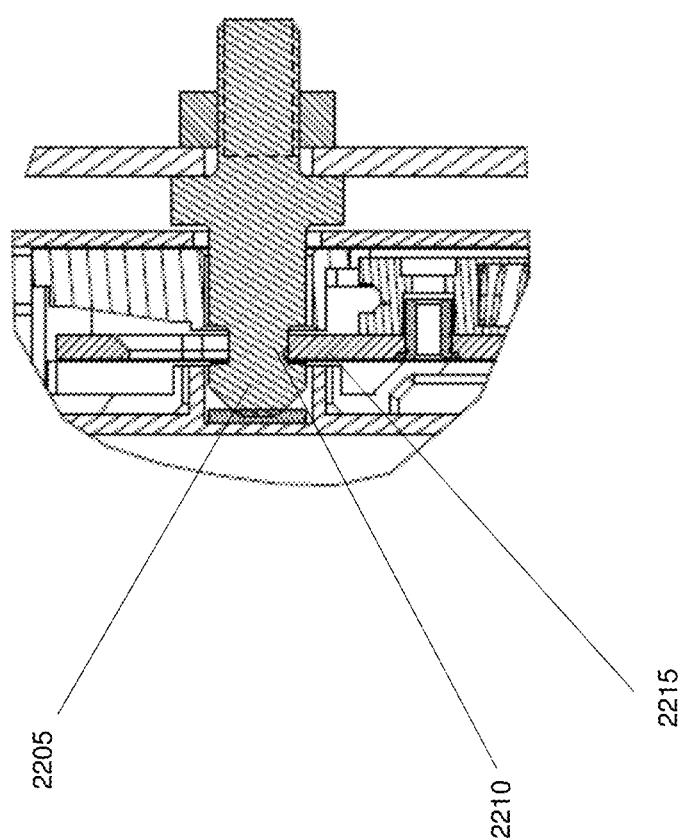
FIG. 22 shows a cross sectional view of a pin inserted into an opening of a quick release attachment assembly in accordance with an aspect of the present disclosure.

FIGS. 20 and 21 illustrate a rear perspective view of a mounting bracket 1810 affixed to the quick release attachment assembly in the rear of a display 1800. FIG. 20 shows the inserted mounting bracket 1810 and FIG. 21 shows the mounting bracket 1810 detached from the quick release attachment assembly 1820. The pins 1812 from the mounting bracket 1810 insert into openings 1822 in the quick release attachment assembly. As shown in the cross sectional close up in FIG. 22, a head 2205 of a pin 1812 may be substantially conically shaped to cooperate with the latch 2215 pushing the latch to an unlocked position during insertion. The conical shape allows the insertion to be done passively, without the application of electrical current. A trough or channel 2210 can be defined behind the substantially conical head 2205. The trough 2210 allows the latch to return the locked position to hold the pins in place when pin 1812 is fully inserted.

Figure 23:
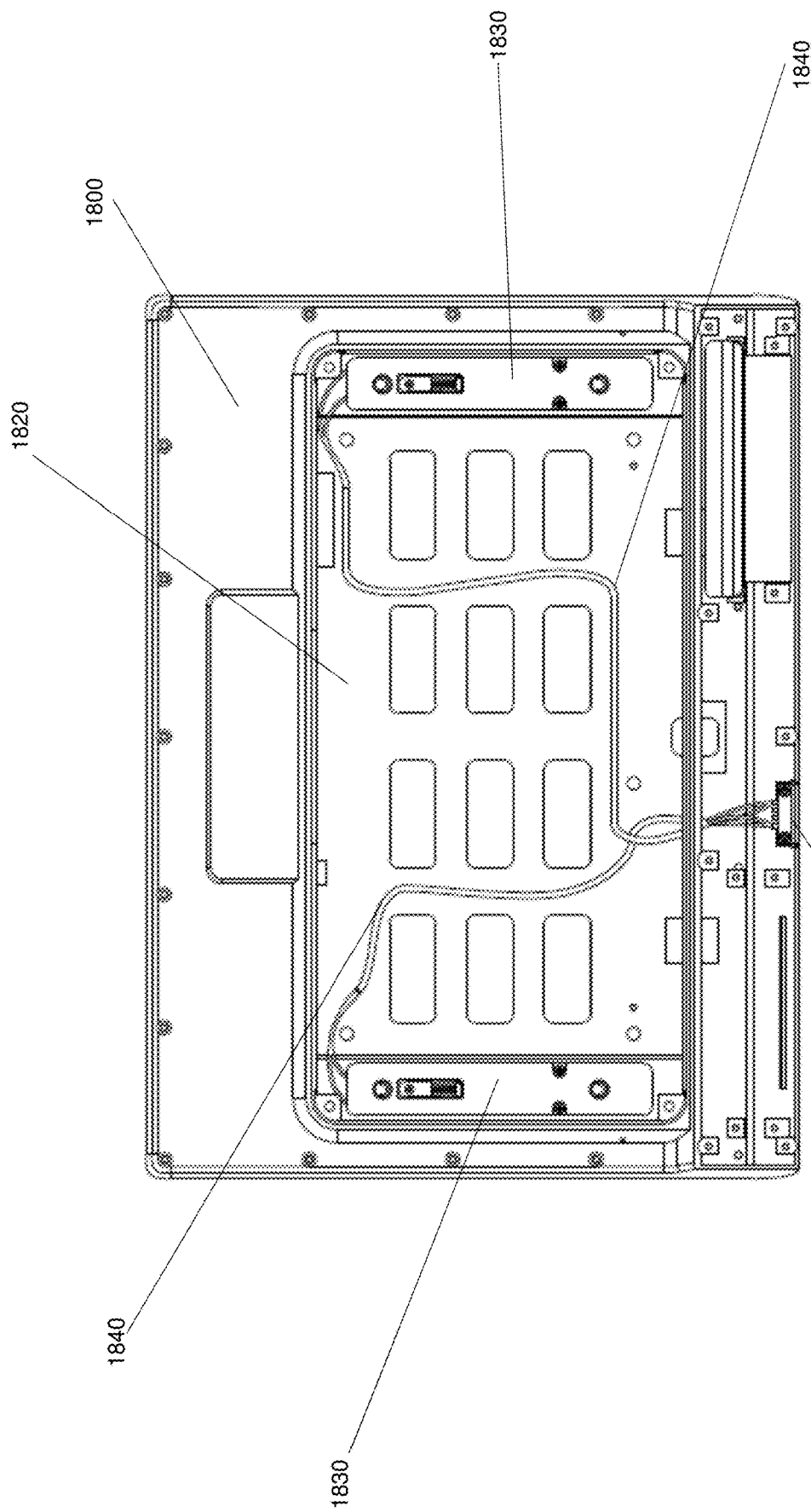
FIG. 23 shows rear view of the display system of FIG. 20 with a back cover removed to show a quick release attachment assembly in accordance with an aspect of the present disclosure.
Figure 24:
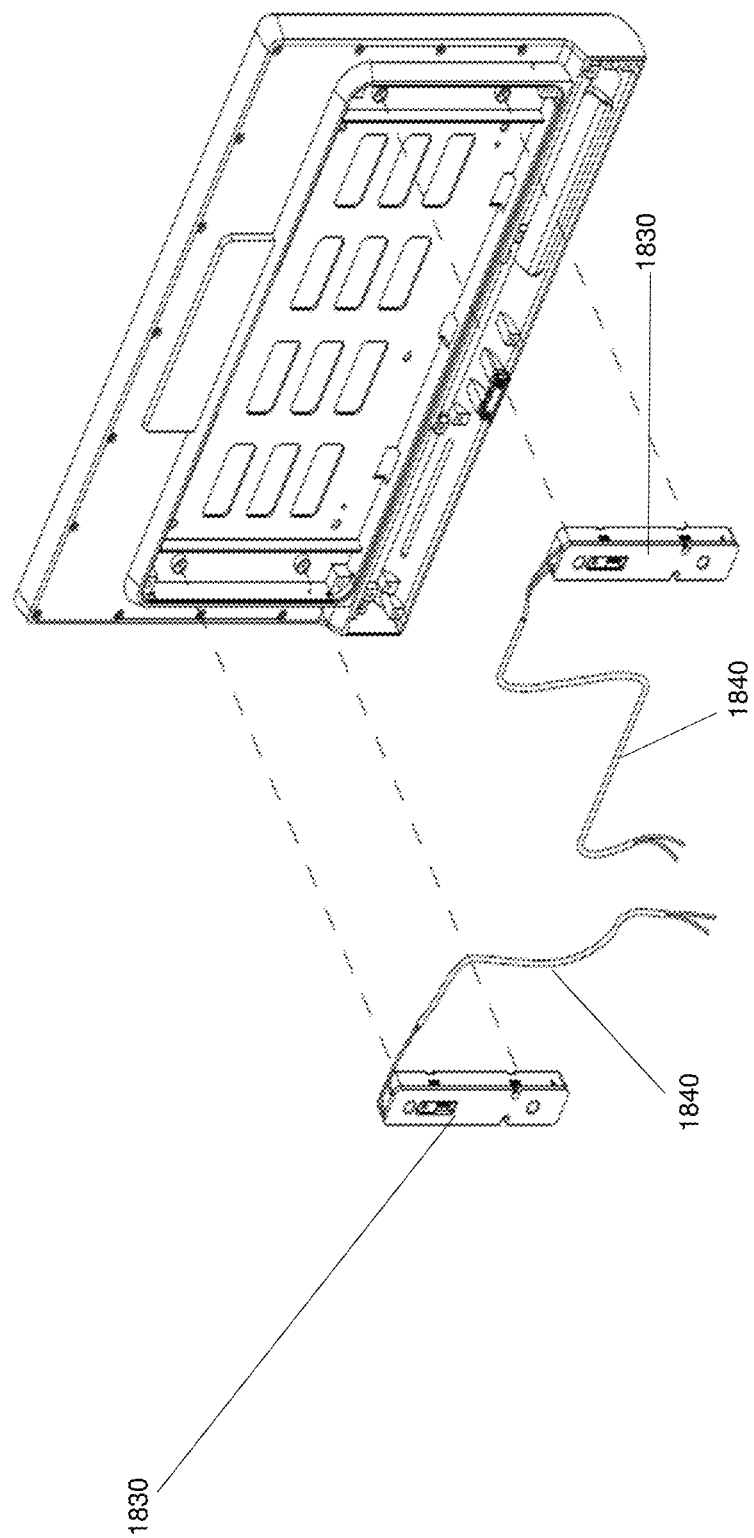
FIG. 24 shows an exploded rear perspective view of the display system of FIG. 20 showing the quick release attachment assembly in accordance with one aspect of the present disclosure.

FIG. 23 show a front view and FIG. 24 shows an exploded from perspective view of the quick release attachment assembly 1820 with the back cover removed. In quick release attachment assembly 1820, the lock modules 1830 are inserted in the lock module cavities. Conductors 1840 connect the lock modules 1830 to the quick release tool port 810.

Figure 25:
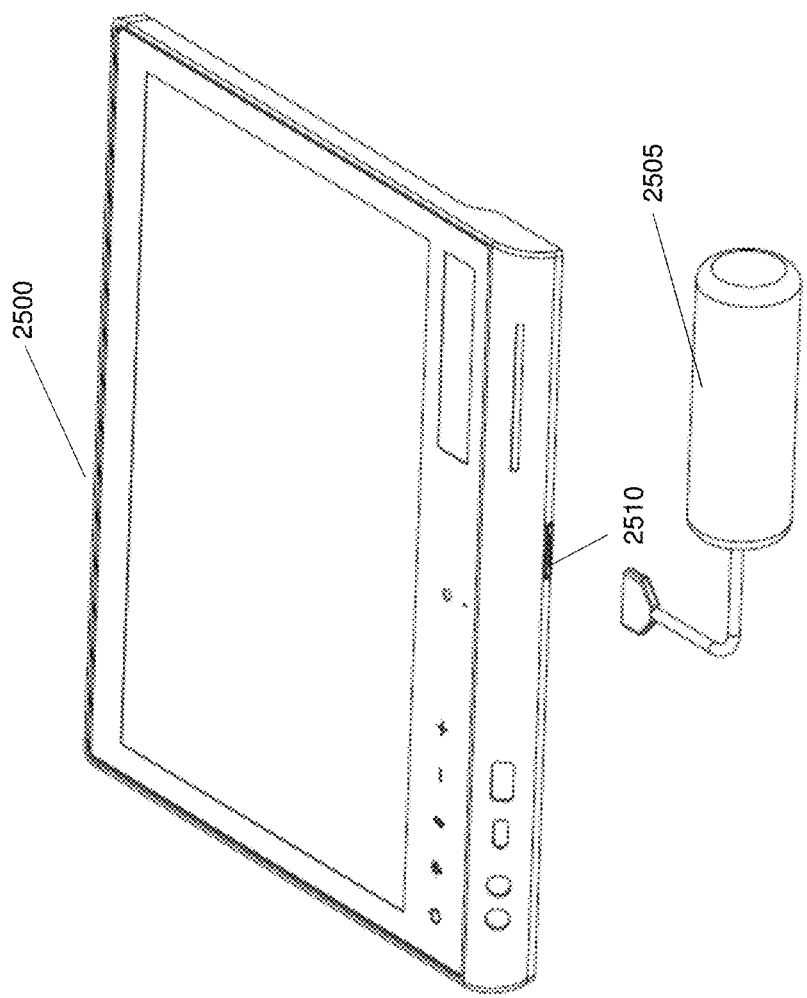
FIG. 25 shows a front, bottom perspective view of the display system of FIG. 20 and a quick release tool in accordance with one aspect of the present disclosure.

A quick release attachment tool couples to the quick release tool attachment port to apply a current that causes the actuator to unlock the latch in accordance with an aspect of this disclosure. FIG. 25 shows a front perspective view of a display system 2500 with a quick release tool 2505 disconnected from the display system. In the illustrated aspect, the tool 2505 is a battery pack that applies current when connected to a circuit. The battery may be a conventional rechargeable type, typically lithium ion or lithium polymer, used to supply charging power to a mobile phone or tablet computer. The tool 2505 can also be configured to receive input power from an adjacent display system USB port, in case the battery is discharged. Additionally the electrical current needed for the quick release tool may be provided from system power, i.e., vehicle electrical power.

The port 2510 may be a conventional USB type for supplying an electrical current to the SMA wire, such as USB-A, USB-B, USB-C, or known port type, such as a port type marketed under the trademark LIGHTNING by Apple Inc. of Cupertino, Calif. The voltage is preferably in a range from 2 volts to 9 volts, and more preferably around 5 volts, which is the voltage frequently used for charging mobile phones. The applied electrical current is preferably in a range from 25 mA up to 4000 mA, depending on the diameter of the wire (greater current for larger diameter wire). More preferably, the applied current does not exceed 500 mA. Generally, electrical current needs to be supplied for only a few seconds, e.g., from one to ten seconds, and should not be applied for a longer period to avoid damaging the wire. The electrical current may be applied in DC or PWM (pulse width modulation). It can also be used in an open loop control system or closed loop with feedback coming from a sensor embedded in the quick release module to help prevent damaging the wire based on sensor feedback for when to automatically switch off the supply of electrical current to the wire from the tool.

Figure 26:
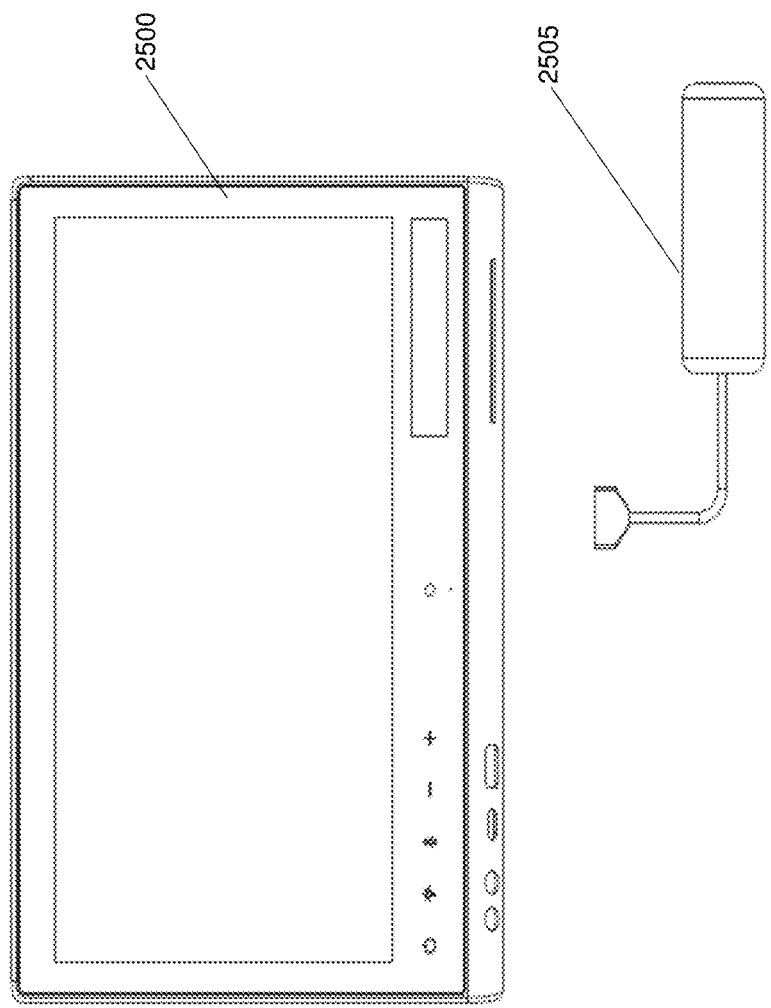
FIG. 26 shows a front view of a display system of FIG. 20 and an unconnected quick release tool in accordance with an aspect of the present disclosure.
Figure 27:
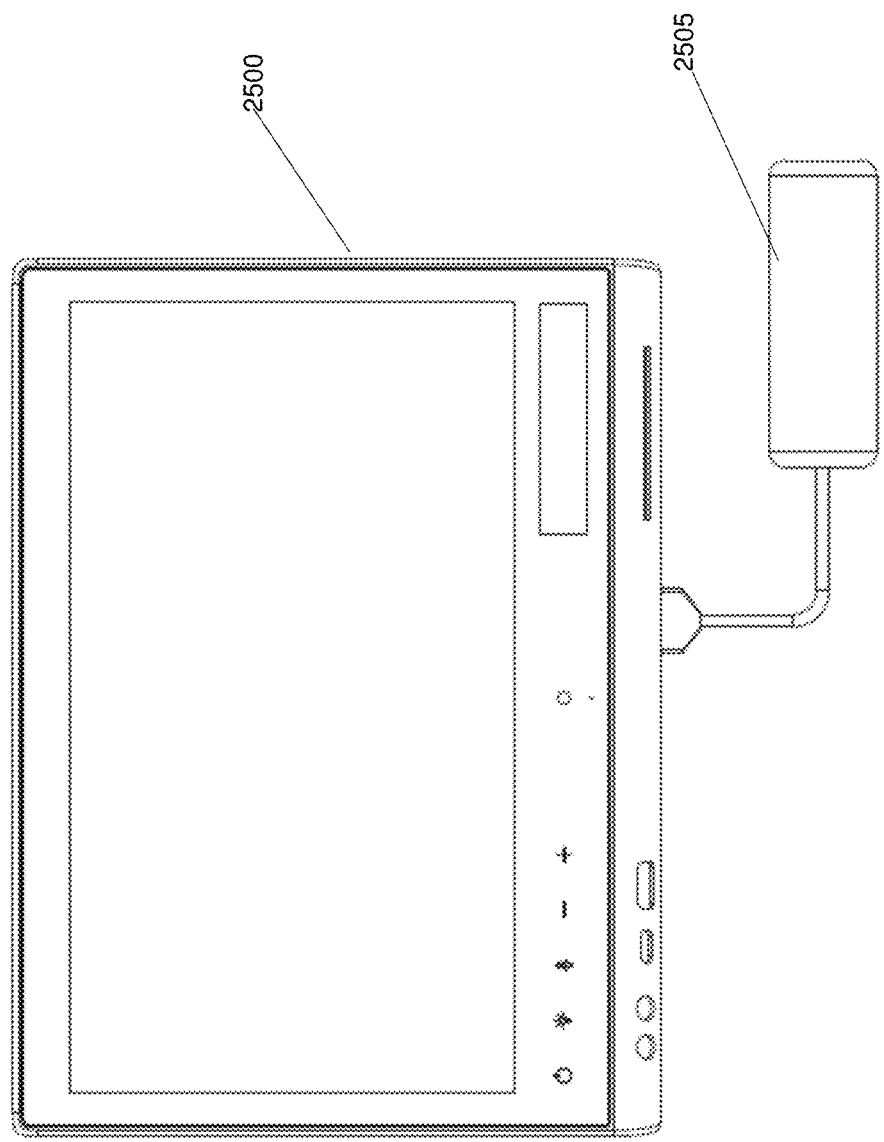
FIG. 27 shows a front view of a display system of FIG. 20 with a connected quick release tool in accordance with an aspect of the present disclosure.

In various other aspects, the release tool 2505 may also include circuitry to provide passwords, codes, or other signals, used to authenticate and/or authorize the tool for use. FIG. 26 shows a front view of display system 2500 disconnected from the quick release tool 2505 and FIG. 27 shows a front view the quick release tool 2505 connected to quick release tool port 2510 of display system 2500.

The above describes a quick release attachment system for display systems. In accordance with aspects of this disclosure, the quick release attachment may be used with conventional mounting brackets by replacing the screws in the mounting brackets with mounting pins that cooperate with a quick release attachment assembly of the display system. Furthermore, the quick release attachment assembly may be made of lightweight materials and use lock modules to provide latches for the pins. The use of lock modules allows the attachment assembly to be adaptable for use with any number of pins by the adding or removal of lock modules from the assembly. In addition, the latch in the lock module is released by the application of electrical current to an actuator such as a light SMA wire. As such, only a connection port for connecting a quick release tool to apply the current is needed. The port may be placed anywhere on the display where the inside circuitry can be configured to carry the applied current to the lock modules to release the latches. In an alternative aspect, the port may be eliminated and replaced with an inductive coil to allow "wireless" coupling with the release tool for application of electrical current to the wire (see reference numeral 810 of FIG. 5, indicating the location of an inductive coil behind the display glass by dots or other marking). Thus, a quick release attachment system in accordance with some aspects of this disclosure, provide a quick, light weight and economical system for affixing displays to a fixture in a vehicle.

Thus, innovative technology for a quick release attachment system has been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A quick release attachment system for affixing a display device to a fixture, the system comprising:
    an attachment assembly in the display device; and
    a lock module in the attachment assembly including:
        a housing with a first opening defined through the housing;

a first latch movable between a locked position and an unlocked position, wherein the locked position places the first latch to at least partially in the first opening to restrain a pin inserted into the first opening in place, and the unlocked position moves the first latch to a position where the pin is unrestrained in the first opening;

a spring biased to hold the first latch in the locked position;

an actuator that overcomes bias of the spring allowing the first latch to move to the unlocked position in response to an applied electric current;

a lock bar in the housing that provides the first latch, the lock bar having an opening defined through the lock bar at a position substantially aligned with the first opening through the housing and the opening through the lock bar has a larger area than the first opening through the housing such that an edge of the opening through the lock bar extends into the first opening through the housing in the locked position when the lock bar is in a first position, and the opening through the housing is unobstructed by the edges of the opening through lock bar in the unlocked position, when the lock bar is in a second position, a spring seat on a first surface of the lock bar having a spring resting surface that is substantially perpendicular to a longitudinal axis of the lock bar; and a midframe guide in the housing that has a spring platform that is substantially perpendicular to a longitudinal axis of the midframe guide;

wherein the spring has a first end that rests on the spring resting surface of the spring seat and a second surface that rests on the spring platform of the midframe guide in an orientation where a longitudinal axis of the spring is substantially parallel to the longitudinal axis of the lock bar and the longitudinal axis of the midframe guide.

2. The system of claim 1, wherein the actuator comprises:

a first terminal and a second terminal affixed to an inner surface of the housing of the lock module; and a wire having a first end affixed to the first terminal, a second end affixed to the second terminal, and a portion between the first end and the second end that is coupled to the spring seat;

wherein the wire is configured to contract in response to the application of the electric current that causes the spring seat to compress the spring against the spring platform causing the lock bar to move from the first position to the second position, moving the first latch from the locked position to the unlocked position.

3. The system of claim 2, further comprising:

a wire guide that is a trough defined around a sidewall of the spring seat in which the portion of the wire coupled to the spring seat rests.

4. The system of claim 3, further comprising:

a first bending post protruding from the first surface on a first side of the midframe guide at an end distal from the spring platform; and a second bending post protruding from the midframe guide at the end distal from the spring platform on a second side that is opposite the first side;

wherein the wire has a first portion between the first terminal and the portion coupled to the spring that bends around the first bending post and a second portion between the second terminal and the portion coupled to the spring seat that bends around the second bending post.

5. The system of claim 1, wherein the lock module further comprises:

a manual release pivotally mounted in the housing under a bottom side of the lock bar that is distal from the spring seat wherein the manual release is biased in a first position and is rotatable to a second position; and wherein the first position causes the manual release to hold the lock bar in the first position where the spring seat holds the spring biased against the spring platform and the second position allows the lock bar to move to a position that causes the first latch to move from the locked position to the unlocked position.

6. The system of claim 1, further comprising:

a mounting bracket affixed to a fixture of a transportation vehicle; and a pin that protrudes out of a surface of the mounting bracket where the pin is aligned with the opening through the housing of the lock module in the attachment assembly.

7. The system of claim 6, wherein the pin has a tapered end that is substantially conical in shape with a defined trough proximate the end of the cone to cooperate with the first latch to push the first latch out of the opening during insertion and hold the latch in the defined trough after insertion.

8. The system claim 1, further comprising:

a tool connectable to the display device for applying current to the actuator; and an interface on the display device for connecting to the tool.

9. The system of claim 1, wherein a display screen in the housing is exposed through a front side of the housing.

10. The system of claim 8, wherein the interface is exposed through an opening through the housing to connect to a power source for the supplying the electric current.

11. A system, comprising:

an attachment assembly for affixing a display device to a fixture; and a lock module in the attachment assembly, the lock module including:

a housing with a first opening defined through the housing;

a lock bar in the housing with a first latch, the first latch movable between a locked position and an unlocked position, wherein in the locked position, the first latch is held by a spring and restrains a pin inserted into the first opening, and in the unlocked position, the first latch is moved to un-restrain the pin;

an actuator to overcome a bias of the spring to move to the first latch to the unlocked position in response to an electric current;

a spring seat having a spring resting surface substantially perpendicular to a longitudinal axis of the lock bar; and a midframe guide in the housing that has a spring platform substantially perpendicular to a longitudinal axis of the midframe guide; wherein the spring has a first end that rests on the spring resting surface of the spring seat and a second end that rests on the spring platform of the midframe guide in an orientation to align the spring parallel to the longitudinal axis of the lock bar and the longitudinal axis of the midframe guide; and a manual release pivotally mounted in the housing under a bottom side of the lock bar that is distal from the spring seat; wherein the manual release is biased in a first position and is rotatable to a second position, the first position causes the manual release to hold the lock bar for biasing the spring against the spring platform, and the second position causes the first latch to move from the locked position to the unlocked position.

12. The system of claim 11, wherein the lock bar includes an opening at a position substantially aligned with the first opening through the housing and the opening through the lock bar has a larger area than the first opening through the housing such that an edge of the opening through the lock bar extends into the first opening through the housing in the locked position when the lock bar is in a first position and the opening through the housing is unobstructed by the edges of the opening through lock bar in the unlocked position when the lock bar is in a second position.

13. The system of claim 11, wherein the actuator comprises:
a first terminal and a second terminal affixed to an inner surface of the housing of the lock module; and
a wire that has a first end affixed to the first terminal, and a second end affixed to the second terminal, and a portion between the first end and the second end is coupled to the spring seat;
wherein the wire is configured to contract in response to the electric current causing the spring seat to compress the spring against the spring platform that moves the first latch from the locked to the unlocked position.

14. The system of claim 13, further comprising:
a wire guide that is a trough defined around a sidewall of the spring seat in which the portion of the wire is coupled to the spring seat rests.

15. The system of claim 14, further comprising:
a first bending post protruding from the first surface on a first side of the midframe guide at an end distal from the spring platform; and
a second bending post protruding from the midframe guide at the end distal from the spring platform on a second side that is opposite the first side;
wherein the wire has a first portion between the first terminal and the portion coupled to the spring that bends around the first bending post and a second portion between the second terminal and the portion coupled to the spring seat that bends around the second bending post.

16. The system of claim 11, further comprising:
a tool connectable to the display device for applying current to the actuator; and
an interface on the display device for connecting to the tool.

17. A system, comprising:
a lock module in an attachment assembly for affixing a display device to a fixture, the lock module including:
a housing with a first opening defined through the housing;
a lock bar with a first latch, the first latch movable between a locked position and an unlocked position, wherein in the locked position, the first latch is held by a spring and restrains a pin inserted into the first opening, and in the unlocked position, the first latch is moved to un-restrain the pin; and
an actuator to overcome a bias of the spring to move to the first latch to the unlocked position in response to an electric current; wherein the actuator includes a first terminal and a second terminal affixed to an inner surface of the housing of the lock module, and a wire that has a first end affixed to the first terminal, and a second end affixed to the second terminal, and a portion between the first end and the second end is coupled to a spring seat having a spring resting surface; wherein the wire is configured to contract in response to the electric current causing the spring seat to compress the spring against a spring platform of a midframe guide to move the first latch from the locked to the unlocked position;
wherein the spring resting surface is substantially perpendicular to a longitudinal axis of the lock bar; and the spring platform is substantially perpendicular to a longitudinal axis of the midframe guide.

18. The system of claim 17, wherein the spring has a first end that rests on the spring resting surface and a second end that rests on the spring platform in an orientation to align the spring parallel to the longitudinal axis of the lock bar and the longitudinal axis of the midframe guide.

19. The system of claim 17, wherein the lock module further comprises:
a manual release pivotally mounted in the housing under a bottom side of the lock bar that is distal from the spring seat; wherein the manual release is biased in a first position and is rotatable to a second position, the first position causes the manual release to hold the lock bar for biasing the spring against the spring platform, and the second position causes the first latch to move from the locked position to the unlocked position.

20. The system of claim 1, wherein the housing of the lock module further includes:
a plurality of openings defined through the housing, wherein the plurality of openings include the first opening;
a plurality of latches including the first latch in the lock module where each of the plurality of latches is associated with one of the plurality of openings and is movable between the locked and unlocked positions;
wherein the spring is biased to hold the plurality of latches in the locked position with a portion of each of the plurality of latches within one of the plurality of openings; and
wherein the actuator overcomes the bias of the spring to allow each of the plurality of latches to move to the unlocked position in response to the applied electric current.

* * * * *